United States Patent
Goto

(10) Patent No.: US 8,927,623 B2
(45) Date of Patent: Jan. 6, 2015

(54) RECORDING INK, INK/MEDIA SET, INK CARTRIDGE, INKJET RECORDING METHOD AND INKJET RECORDING APPARATUS

(75) Inventor: Hiroshi Goto, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 1321 days.

(21) Appl. No.: 12/091,129

(22) PCT Filed: Aug. 20, 2007

(86) PCT No.: PCT/JP2007/066507
§ 371 (c)(1),
(2), (4) Date: Apr. 22, 2008

(87) PCT Pub. No.: WO2008/023812
PCT Pub. Date: Feb. 28, 2008

(65) Prior Publication Data
US 2008/0233363 A1 Sep. 25, 2008

(30) Foreign Application Priority Data

Aug. 22, 2006 (JP) ................................ 2006-225431

(51) Int. Cl.

| | |
|---|---|
| *B41J 2/01* | (2006.01) |
| *B41J 2/17* | (2006.01) |
| *B41J 2/175* | (2006.01) |
| *C08G 73/10* | (2006.01) |
| *C08K 5/05* | (2006.01) |
| *C08K 5/06* | (2006.01) |
| *C08L 27/12* | (2006.01) |
| *C09D 5/00* | (2006.01) |
| *C09D 5/02* | (2006.01) |
| *C09D 11/00* | (2014.01) |
| *C09D 11/10* | (2014.01) |
| *D06M 15/277* | (2006.01) |
| *G01D 11/00* | (2006.01) |
| *C09D 11/40* | (2014.01) |
| *C09D 11/30* | (2014.01) |

(52) U.S. Cl.
CPC ................ *C09D 11/40* (2013.01); *C09D 11/30* (2013.01)
USPC ................... 523/160; 347/1; 347/85; 347/95; 347/100; 523/161; 524/366; 524/376; 524/377; 524/378; 524/386; 524/544

(58) Field of Classification Search
USPC .......... 523/160, 161; 524/366, 376, 377, 378, 524/386, 544; 347/1, 85, 95, 100
See application file for complete search history.

(56) References Cited

U.S. PATENT DOCUMENTS

| | | | |
|---|---|---|---|
| 6,899,754 B2 * | 5/2005 | Yeh et al. ..................... 106/31.6 |
| 2003/0069329 A1 * | 4/2003 | Kubota et al. ................ 523/160 |

FOREIGN PATENT DOCUMENTS

| | | |
|---|---|---|
| JP | 55 69464 | 5/1980 |
| JP | 55 157668 | 12/1980 |
| JP | 62 1426 | 1/1987 |
| JP | 4 18462 | 1/1992 |
| JP | 4 211478 | 8/1992 |
| JP | 4 332774 | 11/1992 |
| JP | 9 111166 | 4/1997 |
| JP | 2667401 | 6/1997 |
| JP | 2675001 | 7/1997 |
| JP | 2867491 | 12/1998 |
| JP | 2000 95983 | 4/2000 |
| JP | 2000 191972 | 7/2000 |
| JP | 3088588 | 7/2000 |
| JP | 2000 517370 | 12/2000 |
| JP | 2001 262025 | 9/2001 |
| JP | 2002 212467 | 7/2002 |
| JP | 2002 301857 | 10/2002 |
| JP | 2002 337449 | 11/2002 |
| JP | 2003 226827 | 8/2003 |
| JP | 2003 277658 | 10/2003 |
| JP | 2004 35718 | 2/2004 |
| JP | 2004 99800 | 4/2004 |
| JP | 2004 155867 | 6/2004 |
| JP | 2004 203903 | 7/2004 |
| WO | 01 08895 | 2/2001 |

OTHER PUBLICATIONS

Machine English Translation of JP 2004-203903, Nakaya et al., Jul. 22, 2004.*

* cited by examiner

*Primary Examiner* — Patrick Niland
(74) *Attorney, Agent, or Firm* — Oblon, Spivak, McClelland, Maier & Neustadt, L.L.P.

(57) ABSTRACT

To provide a recording ink which contains at least a water-dispersible colorant, a water-dispersible resin, a wetting agent, a surfactant and water, wherein the content of the wetting agent in the recording ink is in the range of from 20% by mass to 35% by mass, the total solid content of the water-dispersible colorant and the water-dispersible resin in the recording ink is in the range of from 12% by mass to 40% by mass, the water-dispersible resin contains fluorine resin particulates, and the ratio A:B, where A is the solid content of the water-dispersible resin in the recording ink and B is the solid content of a pigment contained in the water-dispersible colorant in the recording ink, is in the range of 0.5 to 8.

22 Claims, 4 Drawing Sheets

RECORDING INK, INK/MEDIA SET, INK CARTRIDGE, INKJET RECORDING METHOD AND INKJET RECORDING APPARATUS

TECHNICAL FIELD

The present invention relates to a recording ink and an ink/media set which are suitable for inkjet recording, as well as an ink cartridge, an inkjet recording method and an inkjet recording apparatus which use the recording ink and the ink/media set.

BACKGROUND ART

Inkjet recording apparatuses are known as a type of image recording apparatuses used in, for example, printers, facsimile machines and photocopiers. Such inkjet recording apparatus records images by ejecting ink on a recording medium. Because of its uncomplicated image forming process, the inkjet recording apparatus itself can be easily simplified. Moreover, the image forming process of the inkjet recording apparatus dose not require heating the recording medium, and thus it can save energy consumption, and thus it is desirable for the environment. It also has many advantages such as capability of quick recording of high-resolution images, low running cost, low noise level and capability of using a variety of color inks for recording images having a wide color gamut.

Commonly used inks for the inkjet recording apparatus are water-based inks containing a colorant, wetting agents such as glycerine, penetrating agents for controlling permeability of ink to recording paper, surfactants and other additives.

In the inkjet recording method, images are recorded on a recording medium from such liquid water-based ink absorbed on the recording medium. For this mechanism of forming images, variety of inkjet paper having better ink absorbency and capability of fixing and protecting coloring components has been developed. In terms of cost, however, as inkjet paper is produced by applying multiple coatings on a paper base, its production cost is high. And further, due to the large amount of chemical agents contained inkjet paper, it has a poor recyclability compared with regular paper. Thus, inkjet inks that can record high quality images not only on inkjet paper but also on regular paper have been desired.

The obstacle to forming high quality images on regular paper is that is has a poorer ink absorbency than inkjet paper and it dose not provide surface coatings suitable to accept inkjet ink. Thus, it is important to solve the following problems to achieve high quality images on regular paper, the problems include (1) occurrence of feathering (2) occurrence of bleeding (3) reduction in image density (4) degradation of color gamut (5) degradation of water resistance (6) degradation of light resistance (7) degradation of gas resistance (8) degradation of ink fixation characteristic, and (9) passing through to the other side of a recording medium.

In recent years, pigments having better dispersibility and smaller particle diameters have been developed, and such pigments have been started to be used in many inkjet inks. In addition to conventional approaches (including adding surfactants and/or water-soluble resins) to improve the dispersibility of pigments, methods of surface modification, including oxidation treatment on the surface of pigment particles, sulfonation treatment and graft polymerization, have been tried for obtaining hydrophilicity in the pigments to thereby improve dispersion stability thereof. Such pigments can solve (5), (6) and (7) of the above mentioned problems, however, there still exist problems in reliability of inks using the pigments that, because of poor density and color gamut of the pigments compared with dyes, the inks have poorer ejection stability, long term storage stability and redispersability than inks using dyes. Thus, the reliability, density and color gamut of the inks using the pigments have been important problems to be solved. In order to solve those problems, many techniques using colored polymer particles, particularly using emulsioned particles of a polyester or vinyl polymer in inks for inkjet recording have been proposed. Examples of such inks include those disclosed in Patent Literature 1 and non-Patent Literature 1. Examples of such inks further include those containing dispersed compositions of a water-insoluble resin which internally contains a colorant. In addition, it is commonly known that conventional inks using organic pigments as colorants can provide better image density and better color reproducibility on regular paper than conventional pigment inks using water-soluble dispersants.

Conventionally, techniques to obtain suitable permeability to paper in inks have been studied to thereby prevent ink from causing feathering and bleeding and from passing through to the other side of a recording medium, and to improve image density and color gamut. For example, a commercial available ink for inkjet recording has a surface tension of lower than 35 mN/m, and thereby the ink has a high permeability to paper. Such high permeable inks can effectively prevent the occurrences of bleeding and have a good drying characteristic on regular paper. However, the inks tend to cause feathering and record images with insufficient density and images/characters with vagueness.

On the other hand, some commercial available inks have a surface tension of higher than 35 mN/m, and thereby the inks have a slow permeability to paper. Such slow permeable ink slowly permeates into paper to enable it to be accumulated on the surface area of paper. Thus, it can effectively prevent the occurrence of feathering, improve image density and color gamut and prevent it from passing through to the other side of paper. The disadvantages of such low permeable ink are that, because of its low permeability, the drying characteristic drastically degrades on regular paper, and it results in degradation of ink fixation characteristics and causing bleeding on multi-colored images.

Thus, an ink-set which combines a low permeable ink with a high permeable ink has been studied. Such technique can prevent inter-color bleeding, and thus it enables to record high quality images. However, when such ink is used in two-sided printing, it brings low productivity because it requires a long drying time. Thus, some commercial available recording apparatuses are equipped with a heater to reduce the drying time of ink. In such apparatuses, paper is heated with the heater before and after ink is placed thereon. Examples of such apparatuses include the one disclosed in Patent Literature 2. Such disclosed apparatus, however, tends to be large and complicated as it contains a heater. And further, it consumes great amount of energy for heating paper. Thus, the apparatus has no advantages which an inkjet recording apparatus supposed to have.

In addition to the above-stated inks for inkjet recording, many attempts have been made to develop inks which not only have reliability and but also can record high quality images. For example, many inks having as low a viscosity as possible have been developed to prevent them from blocking the nozzles of the inkjet head. Patent Literature 3 proposes an ink that prevents the aggregation of pigment particles in order to prevent the ink from being spread, and can further prevent it from causing the generation of blank spots in images. Patent Literature 3 suggests such ink can be obtained by adjusting the change in its viscosity within 10 times higher than initial viscosity and particle diameters within 3 times larger than initial diameters when the ink is concentrated 2 times. With this technique, however, it is difficult to record high quality images on regular paper with the proposed ink.

In the ink disclosed in Patent Literature 4, the remnant of the ink after its volatile compositions has evaporated is liquid, and the viscosity of the ink in that state is within 10 times higher than the initial viscosity. The disclosed ink has an excellent reliability, while the ink itself is a dye ink which is disadvantageous in terms of image quality compared with a pigment ink.

Patent Literature 5 discloses an ink whose viscosity increases within 600 times after water evaporates therefrom under 60° C. The disclosed ink balances its durability with both reliability and image quality of the ink by adding a water-soluble polymer, while the ink itself is also a dye ink, and thus has a poor water resistance.

Patent Literature 6 suggests that an ink that can record high quality images requires its viscosity be adjusted in the range of from 5 mPa·s to 15 mPa·s. The disclosed technique suggests adjusting the initial evaporation rate of the ink to improve its reliability, and further suggests adding a certain sort of compounds as viscosity adjusters to obtain a desired viscosity in the ink. The disclosed technique thus can solve (3) and (4) of the above-stated problems. The problem of the disclosed technique is that the uniformity in the particle diameter of the used pigment is not taken into consideration. Thus, although it states that the ink has an excellent reliability after left 24 hours, the ink may not be reliable enough after left longer period of time, depending on the configuration of a head and the diameter of nozzles for ejecting ink drops.

As described above, although it is necessary that inks have a high viscosity for rapidly forming high quality images, it is difficult to obtain reliability on such high viscosity inks.

Patent Literatures 7 and 8 each propose adding a water-insoluble resin into a pigment ink to achieve better image quality. Patent Literature 9 proposes an ink that can improve the quality of images formed on regular paper. The disclosed ink has the ratio of a pigment to a resin emulsion in the range of 1:0.1 to 1:1 and an average diameter of a coloring component in the range of 0.3 μm to 1.2 μm. Such inks containing the resin emulsion can prevent the occurrences of bleeding and feathering, while it cannot provide a sufficient image density and reliability as an ink for inkjet recording.

Patent Literature 10 proposes an ink containing a water insoluble resin and having its minimum film formation temperature at 40° C. or higher. Patent Literature 11 proposes an ink having an emulsion diameter of 50 nm or smaller. In those proposed techniques, however, the reliability and image quality are still insufficient and yet to be improved.

Patent Literature 12 discloses an ink containing a pigment, saccharides or derivatives thereof, a polyol having 5 or more hydroxyl groups and a resin emulsion. It states that the ink can record clearer images/characters. But the ink has a low permeability to regular paper, and thus has problems in, for example, preventing inter-color feathering, bleeding and degradation in ink fixation characteristic and ink drying time.

Patent Literature 13 proposes an ink having solid contents of a water dispersible resin and a self-dispersible pigment in the range of 1.0% by mass to 16% by mass. It states that the ink can provide better image quality on regular paper. Although the disclosed ink can provide better water resistance than dye inks, its water resistance is still insufficient to be used with maker pens which are commonly used on regular paper.

Adding a dispersed pigment and a resin emulsion into inks increases the solid content thereof and thus increases the viscosity of the ink. This method to increase ink viscosity has been studied as a means to improve characteristics of ink. Patent Literatures 12 and 14 propose inks in which resin forming micelle-aggregate is added to increase the solid content thereof, while changes in the change in the viscosity of the inks is kept at a small increase. The proposed inks still have an insufficient permeability to regular paper, and thus the quality of images recorded with the ink is still to be improved. The permeability to paper is explained by capillarity represented by Lucas-Washburn equation. Higher viscosity of an ink requires the ink have a lower surface tension and the contact angle of ink drops to paper be arranged in order to obtain sufficient permeability of the ink.

Patent Literatures 15 and 16 propose using polyalcohol alkylether in an ink with a high solid content to increase its permeability. In the proposed inks, however, the viscosity increases accompanied by increase in the solid content, and thus sufficient permeability may not be obtained in the inks, resulting in the degradation of image quality.

That even small amounts of silicone surfactants and/or fluorinated surfactants can increase the permeability of an ink is known, and many attempts have been made to apply this means. For example, Patent Literatures 17 and 18 each propose an inkjet ink containing a fluorinated surfactant. And further, Patent Literatures 19 and 20 each propose an ink having a dispersed pigment and a fluorinated surfactant. Patent Literature 21 proposes an ink which contains a fluorinated surfactant and polymer particulates containing either a water-insoluble and/or hardly-soluble coloring material, and has polymer emulsion and a viscosity of 5 mPa·s or more.

However, color phase changes with increase of the content of the solidified pigments in those proposed inks. Thus a high concentration pigment will not provide desirable color phase, while a self-dispersible pigment will not provide sufficient water resistance and ink fixation characteristic.

[Patent Literature 1]: Japanese Patent Application Laid-Open (JP-A) No. 2000-191972
[Patent Literature 2]: JP-A No. 55-69464
[Patent Literature 3]: JP-A No. 2002-337449
[Patent Literature 4]: JP-A No. 2000-095983
[Patent Literature 5]: JP-A No. 09-111166
[Patent Literature 6]: JP-A No. 2001-262025
[Patent Literature 7]: JP-A No. 55-157668
[Patent Literature 8]: Japanese Patent Application Publication (JP-B) No. 62-1426
[Patent Literature 9]: JP-A No. 04-332774
[Patent Literature 10]: Japanese Patent (JP-B) No. 2867491
[Patent Literature 11]: JP-A No. 04-18462
[Patent Literature 12]: JP-B No. 3088588
[Patent Literature 13]: JP-A No. 2004-35718
[Patent Literature 14]: JP-A No. 2004-99800
[Patent Literature 15]: JP-A No. 2004-155867
[Patent Literature 16]: JP-A No. 2004-203903
[Patent Literature 17]: JP-B No. 2675001
[Patent Literature 18]: JP-B No. 2667401
[Patent Literature 19]: JP-A No. 04-211478
[Patent Literature 20]: JP-A No. 2003-277658
[Patent Literature 21]: JP-A No. 2003-226827
[Non-Patent Literature 1]: "Kinousei ganryou no gijutu to ouyou" published by CMC Publishing CO., LTD.

DISCLOSURE OF INVENTION

An object of the present invention is to solve the forementioned problems, and to provide a recording ink and an ink/ media set that enable recording a high quality image on regular paper, and particularly, preventing the generation of blank spots. And further, the recording ink can record an image having an excellent image density, saturation and image durability characteristics which include water resistance and light resistance, can provide fast-drying images and prevent the ink from causing beading even on regular printing paper having poor ink absorbency, has fast drying speed, and can be used in fast recording processes and stably ejected from nozzles. The present invention is also ink/media set, an inkjet recording method and an inkjet recording apparatus.

The means for solving the forementioned problems are as follows:

<1>. A recording ink, including:
a water-dispersible colorant,
a water-dispersible resin,
a wetting agent,
a surfactant, and
water,
wherein the content of the wetting agent in the recording ink is in the range of from 20% by mass to 35% by mass,
the total solid content of the water-dispersible colorant and the water-dispersible resin in the recording ink is in the range of from 12% by mass to 40% by mass,
the water-dispersible resin contains fluorine resin particulates, and
the ratio A:B, where A is the solid content of the water-dispersible resin in the recording ink and B is the solid content of a pigment contained in the water-dispersible colorant in the recording ink, is in the range of 0.5 to 8.

<2>. The recording ink according to <1>, wherein the water-dispersible colorant contains at least a hydrophilic group at its surface and is a pigment that is water-dispersible under the absence of a dispersant.

<3>. The recording ink according to <1>, wherein the water-dispersible colorant is a polymer emulsion that is composed of polymer particulates containing a water-insoluble and/or hardly-soluble coloring material.

<4>. The recording ink according to <1>, wherein
the water-dispersible colorant is a dispersed pigment containing a pigment, a pigment dispersant and a polymer dispersion stabilizer, and
the polymer dispersion stabilizer is any one of alpha-olefin/maleic anhydride copolymer represented by the following structural formula (1), styrene-(meth)acryl copolymers, water-soluble polyurethane resins and water-soluble polyester resins.

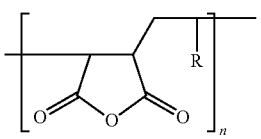

Structural formula (1)

Where R represents an alkyl group, and n represents an integer of 30 to 100.

<5>. The recording ink according to <4>, wherein
the polymer dispersion stabilizer has a weight average molecular weight of 20,000 or lower and an acid value of 40 mgKOH/g to 400 mgKOH/g, and is dissolved in any one of an alkali solution and alkali water-solution having an alkalinity value equivalent to or higher than the acid value to be used.

<6>. The recording ink according to one of <4> and <5>, wherein the pigment dispersant is an anion surfactant or a nonionic surfactant having an HLB value of 10 to 20.

<7>. The recording ink according to <6>, wherein the nonionic surfactant is any one of polyoxyethylene-β-naphthylether, polyoxyethylene laurylether and polyoxyethylene styrene phenylether.

<8>. The recording ink according to any one of <1> to <7>, wherein the fluorine resin particulates contain a fluoroolefin unit and have a minimum film forming temperature of 30° C. or lower.

<9>. The recording ink according to any one of <1> to <8>, wherein the wetting agents is at least any one selected from glycerins, diethylene glycol, triethylene glycol, 1,3-butanediol, 3-methyl-1,3-butanediol, 2-pyrrolidone and N-methyl-2-pyrrolidone.

<10>. The recording ink according to any one of <1> to <9>, wherein the surfactant includes at least one selected from silicone surfactants and fluorine surfactants.

<11>. The recording ink according to any one of <1> to <10>, wherein the viscosity thereof at 25° C. is in the range of from 5 mPa·s to 20 mPa·s, and the surface tension thereof is 35 mN/m or lower.

<12>. An ink/media set, including:
the recording ink according to any one of <1> to <11>, and
a recording medium,
wherein the recording medium includes a base and a coating layer which is provided on at least one surface of the base, and
the transfer amount of pure water to the recording medium, measured with a dynamic scanning absorptometer, is in the range of from 2 ml/m² to 35 ml/m² at a contacting time of 100 ms and in the range of from 3 ml/m² to 40 ml/m² when measured at a contacting time of 400 ms.

<13>. An ink cartridge, including a container for housing the recording ink according to any one of <1> to <11>.

<14>. An inkjet recording method, including ejecting drops of the recording ink according to any one of <1> to <11> by applying an impulse thereto to record an image.

<15>. The inkjet recording method according to <14>, wherein the impulse is at least any one selected from heat, pressure, vibration and light.

<16>. An inkjet recording apparatus, including a means for ejecting drops of the recording ink according to any one of <1> to <11> by applying an impulse thereto to record an image.

<17>. The inkjet recording apparatus inkjet recording method according to <16>, wherein the impulse is at least any one selected from heat, pressure, vibration and light.

<18>. An ink recorded matter, including:
a recording medium and an image formed on the recording medium,
wherein the image is formed using the recording ink according to any one of <1> to <11>.

<19>. An ink recorded matter, including:
the recording medium of the ink/media set according to <12>, and
an image formed on the recording medium, wherein the image is formed using the recording ink of the ink/media set according to <12>.

The recording ink of the present invention contains at least a water-dispersible colorant, a water-dispersible resin, a wetting agent, a surfactant and water, wherein the content of the wetting agent in the recording ink is in the range of from 20% by mass to 35% by mass, the total solid content of the water-dispersible colorant and the water-dispersible resin in the recording ink is in the range of from 12% by mass to 40% by mass, the water-dispersible resin contains fluorine resin particulates, and the ratio A:B, where A is the solid content of the water-dispersible resin in the recording ink and B is the solid content of a pigment contained in the water-dispersible colorant in the recording ink, is in the range of 0.5 to 8.

The recording ink of the present invention can record a high quality image on regular paper, and particularly, prevent the generation of blank spots. And it also can record an image having an excellent image density, saturation and durabilitis which includes water resistance and light resistance, has fast drying speed, can be used in fast recording processes and can be stably ejected from nozzles.

The ink can further record fast-drying images and prevent the ink from beading even on regular printing paper which is a recording medium having a poor ink absorbency, wherein the recording medium has a base and a coating which is provided on at least one side of the base, the transfer amount of pure water to the recording medium is in the range of from 2 ml/m$^2$ to 35 ml/m$^2$ when measured at a contacting time of 100 ms and with a dynamic scanning absorptometer, and the transfer amount of pure water to the recording medium is in the range of from 3 ml/m$^2$ to 40 ml/m$^2$ when measured at a contacting time of 400 ms.

The ink/media set of the present invention contains the recording ink of the present invention and a recording medium, wherein the recording medium has a base and a coating which is provided on at least one side of the base, the transfer amount of pure water to the recording medium is in the range of from 2 ml/m$^2$ to 35 ml/m$^2$ when measured at a contacting time of 100 ms and with a dynamic scanning absorptometer, and the transfer amount of pure water to the recording medium is in the range of from 3 ml/m$^2$ to 40 ml/m$^2$ when measured at a contacting time of 400 ms.

The ink/media set of the present invention can record a high quality image on regular paper, and particularly, prevent the generation of blank spots. And further, it can record an image having an excellent image density, saturation and durability characteristics which include water resistance and light resistance, has fast drying speed, can be used in fast recording processes and can be stably ejected from nozzles.

The ink can further record fast-drying images and prevent the ink from beading even on regular printing paper which is a recording medium having poor ink absorbency, wherein the recording medium has a base and a coating which is provided on at least one side of the base, the transfer amount of pure water to the recording medium is in the range of from 2 ml/m$^2$ to 35 ml/m$^2$ when measured at a contacting time of 100 ms and with a dynamic scanning absorptometer, and the transfer amount of pure water to the recording medium is in the range of from 3 ml/m$^2$ to 40 ml/m$^2$ when measured at a contacting time of 400 ms.

The ink cartridge of the present invention is a container for storing the recording ink of the present invention. The ink cartridge is preferably used in inkjet printers. The ink stored in the ink cartridge can prevent the generation of blank spots on regular paper. And further, it can record an image having an excellent image density, saturation and image durability characteristics which include water resistance and light resistance, can provide fast-drying images and prevent the ink from causing beading even on gloss printing paper, has fast drying speed, can be used in fast recording processes and can be stably ejected from nozzles.

The inkjet recording apparatus of the present invention contains at least an ink ejection unit which applies energy to the recording ink of the present invention to eject drops of the recording ink to thereby record images. In the inkjet recording apparatus, the ink ejection unit applies energy to the recording ink of the present invention to eject the ink drops to thereby record images. Thus, when the recording apparatus is used for recording images on regular paper, it can prevent the generation of blank spots, and further can record images having an excellent image density, saturation and image durability characteristics which include water resistance and light resistance. And also it can provide fast-drying images and prevent the ink from beading even on gloss printing paper, has fast drying speed, can be used in fast recording processes, can be stably ejected from nozzle, and can record images as good quality as offset-printed matters.

The inkjet recording method of the present invention contains at least an ink ejection step which applies energy to the recording ink of the present invention to eject drops of the recording ink to thereby record images. In the inkjet recording method, the ink ejection step applies energy to the recording ink of the present invention to eject the ink drops to thereby record images. Thus, when the recording method is used for recording images on regular paper, it can prevent the generation of blank spots, and further can record images having an excellent image density, saturation and image durability characteristics which include water resistance and light resistance. And also it can provide fast-drying images and prevent the ink from beading even on gloss printing paper, has fast drying speed, can be used in fast recording processes, can be stably ejected from nozzle, and can record images as good quality as offset-printed matters.

The ink recorded matter of the present invention is composed of a recording medium and an image formed on the recording medium using the recording ink of the present invention.

The ink recorded matter of the present invention is composed of a recording medium of the ink/media set of the present invention and an image formed on the recording medium using the recording ink of the ink/media set of the present invention.

When the ink recorded matter of the present invention is regular paper, it is possible to prevent the generation of blank spots, record images having an excellent image density, saturation and image durability characteristics which include water resistance and light resistance, record fast-drying images even on gloss printing paper while preventing its beading, achieve fast drying speed, can be used in fast recording processes, can be stably injected from nozzles, and can record images as good quality as offset-printed matters.

And further, it is possible to record fast-drying images and prevent the ink from beading even on regular printing paper which is a recording medium having poor ink absorbency, wherein the recording medium has a base and a coating which is provided on at least one side of the base, the transfer amount of pure water to the recording medium is in the range of from 2 ml/m$^2$ to 35 ml/m$^2$ when measured at a contacting time of 100 ms and with a dynamic scanning absorptometer, and the transfer amount of pure water to the recording medium is in the range of from 3 ml/m$^2$ to 40 ml/m$^2$ when measured at a contacting time of 400 ms.

Figure 1:
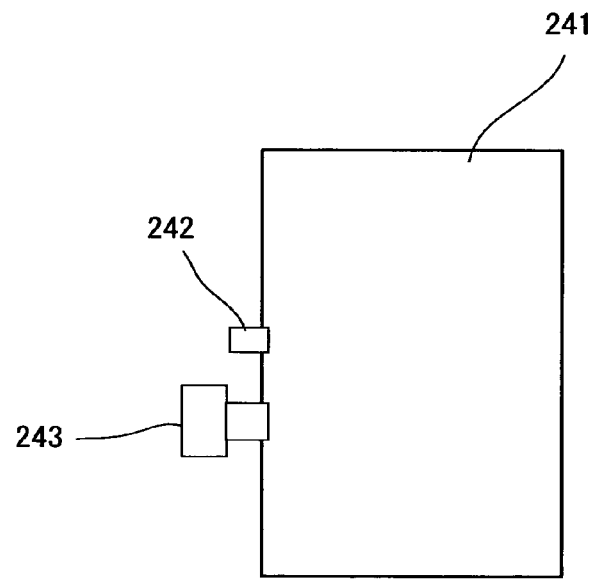
FIG. 1 is a schematic view showing one example of an ink cartridge of the present invention.

BEST MODE FOR CARRYING OUT THE INVENTION (Recording Ink)

The recording ink of the present invention contains at least a water-dispersible colorant, a water-dispersible resin, a wetting agent, a surfactant, water and a penetrating agent, and it further contains other components in accordance with necessity.

In the present invention, the water-dispersible resin contains fluorine resin particulates, and the ratio A:B, where A is the solid content in the recording ink and B is the solid content of a pigment contained in the water-dispersible colorant in the recording ink, is in the range of 0.5 to 8, and preferably is in the range of 2 to 6. When the ratio is in the ranges, the ink fixation characteristic and color gamut are improved. The solid content of the water-dispersible resin is preferably 3, 4 or more times higher than that of the pigment for improving the color gamut and the image density, while it is preferably within 8 times higher as the marginal improvements in the color gamut and image density diminish over the range. And when the ratio, A/B, is less than 0.5, ink fixation characteristic may be degraded in the image portions and/or ink may pass through to the other side of paper.

The total content of the water-dispersible colorant and water-dispersible resin to the total mass of the recording ink is preferably in the range of from 12% by mass to 40% by mass, and more preferably in the range of from 15% by mass to 35% by mass. When the total content is in those ranges, the ink can record clear images/characters. When the total content is less than 12% by mass, drying characteristics of the ink may be degraded on paper, and further, clear images/characters may not be recorded on regular paper. And when it is more than 40% by mass, the ink may easily block the nozzles, causing ejection failures.

Extracting only the colorant and water-dispersible resin from the ink is an example of means to measure the solid contents of the water-dispersible colorant, the pigment of the water-dispersible colorant and the water-dispersible resin. And when a pigment is used as the colorant, the proportion of the colorant and water-dispersible resin can be determined based on the mass reduction rate obtained by a thermal mass analysis. When the colorant is, for example, a pigment or a dye, and its molecular structure is known, the solid content of the colorant can be determined by the nuclear magnetic resonance analysis, or NMR. When the colorant is, for example, an inorganic pigment contained in heavy metal atom/molecular frame, a metal-containing organic pigment or a metal-containing dye, and its molecular structure is known, the solid content of the colorant can be determined by the X-ray fluorescence analysis, or XRF.

<Water-Dispersible Colorant>

The water-dispersible colorant in the first structure is a pigment that has at least a hydrophilic group on its surface and shows water-dispersibility under the existence of no dispersant. Thus, the pigment may be hereinafter called self-dispersible pigment.

The water-dispersible colorant in the second structure is a polymer emulsion composed of polymer particulates containing a water-insoluble and/or hardly-soluble colorant.

The water-dispersible colorant in the third structure is a dispersed pigment containing a pigment, a pigment dispersant and a polymer dispersion stabilizer, wherein the polymer dispersion stabilizer is at least any one of selected from an alpha-olefin/maleic anhydride copolymer represented by the following structural formula 1, styrene-(meta)acryl copolymer, water-soluble polyurethane resin and water-soluble polyester resin.

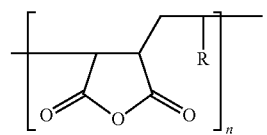

Structural formula (1)

Where R represents an alkyl group, and n represents an integer of 30 to 100.

—Pigment—

As the above-stated pigment, organic pigments and inorganic pigments can be used. A dye can also be used as a pigment for adjusting color tones, while the content of the dye should be limited within a range in which durability of the ink will not degraded.

Examples of the inorganic pigments include titanium oxides, iron oxides, calcium carbonates, barium sulfates, aluminium hydroxides, barium yellow, cadmium red, chromium yellow and carbon blacks. Among those organic pigments, the carbon black is preferable. Examples of the carbon black include those produced by known methods such as a contact method, a furnace method or a thermal method.

Examples of the organic pigments include azo pigments, polycyclic pigments, dye chelates, nitro pigments, nitroso pigments and aniline blacks. Among those organic pigments, the azo pigments and polycyclic pigments are preferable. Examples of the azo pigments include azo lakes, insoluble azo pigments, condensed azo pigments and chelate azo pigments. Examples of the polycyclic pigments include phthalocyanine pigments, perylene pigments, perinone pigments, anthraquinone pigments, quinacridone pigments, dioxadine pigments, indigoid pigments, thioindigoid pigments, isoindolinone pigments and quinophtalone pigments. Examples of the dye chelates include basic dye chelates and acidic dye chelates.

The color of the colorant is not particularly limited and can be appropriately selected depending on the purpose. Examples thereof include colorants used for an achromatic color and for variety of other colors. These may be used alone or in combination.

Examples of colorants used for an achromatic color include carbon blacks (C.I. pigment black 7) such as furnace blacks, lamp blacks, acetylene blacks and channel blacks; metals such as copper, iron (C.I. pigment black 11) and titanium oxide; and organic pigments such as aniline black (C.I. pigment black 1).

Examples of colorants used for colors include C.I. pigment yellow 1, 3, 12, 13, 14, 17, 24, 34, 35, 37, 42 (yellow iron oxide), 53, 55, 74, 81, 83, 95, 97, 98, 100, 101, 104, 408, 109, 110, 117, 120, 128, 138, 150, 151, 153 and 183; C.I. pigment orange 5, 13, 16, 17, 36, 43, and 51, C. I. pigment red 1, 2, 3, 5, 17, 22, 23, 31, 38, 48:2 and 48:2 (permanent red 2B (Ca)), 48:3, 48:4, 49:1, 52:2, 53:1, 57:1 (brilliant carmin 6B), 60:1, 63:1, 63:2, 64:1, 81, 83, 88, 101 (iron oxide red), 104, 105, 106, 108 (cadmium red), 112, 114, 122 (quinacridone magenta), 123, 146, 149, 166, 168, 170, 172, 177, 178, 179, 185, 190, 193, 209 and 219; C.I. pigment violet 1 (rhodamine lake), 3, 5:1, 16, 19, 23, and 38, C.I. pigment blue 1, 2, 15 (copper phthalocyanine blue), 15:1, 15:2, 15:3 (copper phthalocyanine blue), 16, 17:1, 56, 60, the 63; and C.I. pigment green 1, 4, 7, 8, 10, 17, 18, and 36.

The self-dispersible pigment in the first structure is a surface-modified pigment to whose surface at least a hydrophilic group is bound either directly or through another atom group. The surface is modified by chemically binding a functional group (such as sulfone groups or carboxyl groups) to the surface of the pigment or by a wet-oxidation treatment using at least one of a hypohalous acid and a salt thereof. Of pigments obtained by those methods, a water-dispersed pigment to whose surface a carboxyl group is bound is particularly preferable. Such surface-modified pigments to which the carboxyl group is bound not only can improve the dispersion stability but also enable to record high quality and clear images/characters and provide a recording medium after printed with better water resistance.

An ink using the pigments is excellent in redispersibility after drying. Thus, the ink will not block inkjet nozzles of an inkjet head even when the ink is kept in an inkjet recording apparatus without being used for a long time and water evaporates from ink existing around the nozzles. That is to say, simply cleaning will be enough for maintaining the ability of the inkjet head to record high quality images.

The volume average particle diameter ($D_{50}$) of the self-dispersible pigment in the ink is preferably in the range of from 0.01 μm to 0.16 μm.

For example, self-dispersible carbon blacks having ionic property and charged anionically or cationically are preferably used.

Examples of anionic hydrophilic group include —COOM, —$SO_3M$, —$PO_3HM$, —$PO_3M_2$, —$SO_2NH_2$ and —$SO_2NHCOR$ (where M represents a hydrogen atom, an alkali metal, an ammonium or an organic ammonium). In the formulas, R represents an alkyl group having 1 to 12 carbon atoms, a phenyl group which may have substituents, or a naphthyl group which may have substituents. With those groups, it is preferable to use color pigments to whose surface —COOM or —$SO_3M$ is bound.

In the above-stated hydrophilic groups, M may be an alkali metal such as lithium, sodium or potassium. It may be an organic ammonium such as mono- and/or tri-methyl ammonium, mono- and/or tri-ethyl ammonium or mono- and/or tri-methanol ammonium. The methods of obtaining the color pigment anionically charged include introducing —COONa onto the surface of the color pigment. Means to introduce —COONa include oxidation-treatment with sodium hypochlorite, sulfonation and reacting diazonium salt.

As the cationic hydrophilic group, quaternary ammonium groups are preferable. The quaternary ammonium groups shown below are more preferable, and in the present invention, any one of the quaternary ammonium groups whose surface is bound to the surface of a carbon black is preferably used as a coloring material.

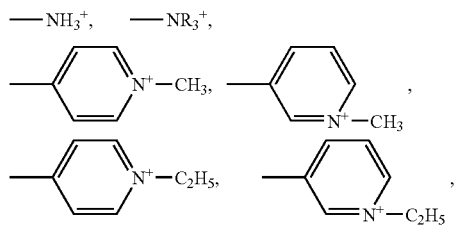

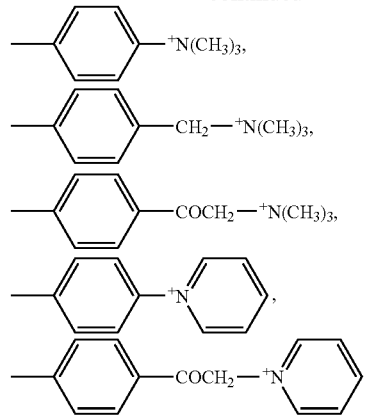

The methods of producing the cationic self-dispersible carbon blacks to which the hydrophilic group is bound are not particularly limited, and can be appropriately selected depending on the purpose. Examples thereof include treating the carbon black with 3-amino-N-ethylpyridium bromide as a means for binding N-ethylpyridyl group represented by the following structural formula.

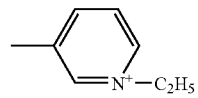

The hydrophilic group may be bound to the surface of the carbon black through another atomic group. Examples of the other atomic group include alkyl groups having 1 to 12 carbon atoms, phenyl groups which may have a substituent and naphthyl groups which may have a substituent. Specific examples of the hydrophilic group bound to the carbon black surface through the other atomic group include —$C_2H_4COOM$ (where M represents an alkali metal or quaternary ammonium), —$PhSO_3M$ (where Ph represent a phenyl group, M represents an alkali metal or quaternary ammonium), and —$C_5H_{10}NH_3^+$.

The water-dispersible colorant in the second structure can be, in addition to the above-stated pigments, a polymer emulsion composed of polymer particulates containing a pigment. The polymer emulsion is a polymer particulate in which a pigment is enclosed and/or a polymer particulate to whose surface a pigment is adhered. In such case, not all the pigment is necessarily enclosed and/or adhered, and the pigment may be dispersed in the emulsion within a certain amount in which the effect of the present invention will not be spoiled. The polymers for forming the polymer emulsion include vinyl polymers, polyester polymers and polyurethane based polymers. The polymers particularly preferably used are vinyl polymers and polyester polymers. Those polymers are disclosed in, for example, JP-A No. 2000-53897 and JP-A No. 2001-139849.

A complex pigment composed of particles of a known organic/inorganic pigment and covered with an organic pigment or carbon black can be preferably used. Such complex pigments can be obtained by, for example, extracting an organic pigment under the existence of particles of an inorganic pigment or by a mechanochemical method in which inorganic pigment and organic pigment are mechanically mixed/pulverized. Upon necessity, a layer of organosilane compound composed of polysiloxane or alkylsilane can be provided in between a layer of an inorganic pigment and a layer of organic pigment to enhance the binding of the two layers.

Examples of the organic pigment include black pigments such as aniline black; and collar pigments such as anthraquinones, phthalocyanine blues, phthalocyanine greens, diazos, monoazos, pyranetrons, perylenes, heterocyclic yellows, quinacridones and (thio)indigoides. Among those, pigments of carbon blacks, phthalocyanines, quinacridones, monoazo yellows, disazo yellows and heterocyclic yellows are particularly preferable in terms of color gamut.

Representative examples of the phthalocyanine blues include copper phthalocyanine blue and derivatives thereof (C.I. pigment blue 15:3, 15:4) and aluminum phthalocyanine. Examples of the quinacridones include C. I. pigment orange 48; C. I. pigment orange 49; C. I. pigment red 122; C. I. pigment red 192; C. I. pigment red 0.202; C. I. pigment red 206; C. I. pigment red 207; C. I. pigment red 209; C. I. pigment violet 19; and C. I. pigment violet 42. Representative examples of the monoazo yellows include C. I. pigment yellow 74, C. I. pigment yellow 109, C. I. pigment yellow 128 and C. I. pigment yellow 151. Representative examples of the disazo yellows include C. I. pigment yellow 14, C. I. pigment yellow 16, and C. I. pigment yellow 17. Representative examples of the heterocyclic yellows include C. I. pigment yellow 117 and C. I. pigment yellow 138. Other appropriate pigment can be found in The Color Index, the third edition (published by the Society of Dyers and Colorists, 1982).

Examples of the inorganic pigments include titanic dioxides, silicas, aluminas, iron oxides, iron hydroxides and tin oxides. In terms of the shape of those particles, smaller aspect ratio is more preferred, and the particles are most preferably spherical. When a coloring material is adhered to the surface, the color of the inorganic pigment is preferably transparent or white. When a black colorant is adhered to the surface, a black inorganic pigment may be used. The primary particle diameter of the particles of the inorganic pigment is preferably 100 nm or smaller, and more preferably in the range of 5 nm to 50 nm.

The mass ratio of the particles of the inorganic pigment and either the organic pigment (or a colorant) or a carbon black as a coloring material is preferably in the range of 3:1 to 1:3, and more preferably in the range of 3:2 to 1:2. When the amount of the coloring material is insufficient, the color gamut and coloring ability may be degraded. And when an excessive amount of the colorant is contained, the clarity and color tones may be degraded.

Examples of such particles of inorganic pigment as a coloring material, covered with an organic pigment or carbon black, include silica/carbon black complex material, silica/phthalocyanine PB (15:3) complex material, silicaldisazo yellow complex material and silica/quinacridone PR122 complex material (all manufactured by Toda Kogyo Corporation). They are preferable because of their small average primary diameter.

When a particle of an inorganic pigment, having a primary particle diameter of 20 nm, is covered with an organic compound whose amount is equal to the particle, the resulted pigment particle will have a primary particle diameter of around 25 nm can be obtained. By using an appropriate dispersant to disperse the particles with the primary diameter, a fine pigment-dispersed ink composed of dispersed particles having a diameter of 25 nm. In such complex pigment, not only the organic pigment provided on the surface but also the inorganic pigment covered with the thin organic layer having thickness of around 2.5 nm affects the dispersed state. Thus, it is important to select a pigment dispersant that can stably disperse both the organic and inorganic pigments at the same time.

The water-dispersible colorant in the third structure is a dispersed pigment which contains the inorganic pigment, organic pigment, complex pigment, pigment dispersant and polymer dispersion stabilizer, wherein the polymer dispersion stabilizer is preferably any one selected from an alpha-olefin/maleic anhydride represented by the following structural formula 1, styrene-(meta)acryl copolymer, water-soluble polyurethane resin and water-soluble polyester resin.

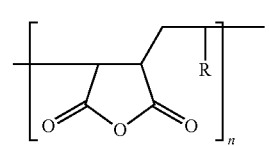

Structural formula (1)

Where R represents an alkyl group, and n represents an integer of 30 to 100. The alkyl group preferably has 6 to 25 carbon atoms, and more preferably has 6 to 22 carbon atoms.

The polymer dispersion stabilizer is an effective means to stably maintain the dispersed condition of the pigment uniformly dispersed in water with the pigment dispersant. The alpha-olefin/maleic anhydride, styrene-(meta)acryl copolymer, water-soluble polyurethane resin and water-soluble polyester resin represented by the structural formula 1 is solid under room temperature and hardly dissolved in cold water. When dissolved in an alkali solution or an alkali water-solution having an alkalinity value equivalent to or higher than, or preferably 1.0 to 1.5 times higher than, the acid value of the copolymer/resin, they function as a dispersion stabilizer.

By heating and mixing the mixture of the copolymer/resin and the alkali solution/alkali water-solution, they can be easily dissolved in the solution. When the alpha-olefin/maleic anhydride copolymer contains a long olefin chain, it will not easily be dissolved and may generate an undissolved matter. In such case, the effect thereof as a dispersion stabilizer can be maintained by appropriately filtering out the undissolved matter.

Examples of the base of the alkali solution or alkali water-solution include hydroxides such as sodium hydroxide, potassium hydrate and lithium hydroxide; basic substances such as ammonium, triethylamine and morpholine; and alcohol amines such as tryethanolamine, diethanolamine, N-methyldiethanolamine, 2-amino-2-ethyl-1,3-propanediol and choline.

For the alpha-olefin maleic anhydride copolymer, represented by the structural formula 1, either those appropriately synthesized or commercially available products may be used. Examples of the commercially available products include T-YP112, T-YP115, T-YP114 and T-YP116 (all manufactured by SEIKO PMC Corporation).

For the styrene-(meta)acryl copolymer, either those appropriately synthesized or commercially available products may be used. Examples of the commercially available products include JC-05 (manufactured by SEIKO PMC Corporation), and ARUFONUC-3900, ARUFONUC-3910 and ARUFONUC-3920 (all manufactured by Toagosei Co., Ltd.).

For the water-soluble polyurethane resin, either those appropriately synthesized or commercially available products may be used. Examples of the commercially available products include TAKELAC®W-5025, TAKELAC®W-

6010 and TAKELAC®W-5661 (all manufactured by MITSUI TAKEDA CHEMICALS, INC.).

For the water-soluble polyester resin, either those appropriately synthesized or commercially available products may be used. Examples of the commercially available products include NICHEGO POLYESTER W-0030, NICHEGO POLYESTER W-0005S30WO and NICHEGO POLYESTER WR-961 (all manufactured by The Nippon Synthetic Chemical Industry Co., Ltd.), and PESRESINA-210 and PESRESIN A-520 (all manufactured by TAKAMATSU OIL&FAT CO., LTD.).

The acid value of the polymer dispersion stabilizer is preferably in the range of from 40 mgKOH/g to 400 mgKOH/g, and more preferably in the range of from 60 mgKOH/g to 350 mgKOH/g. When the acid value is less than 40 mgKOH/g, the resolvability of the alkali solution may be degraded. And when the value is more than 400 mgKOH/g, the viscosity of the pigment increases, and it may result in causing ejection failures and/or degradation of the dispersion stability of the pigment.

The mass average molecular weight of the polymer dispersion stabilizer is preferably 20,000 or less, and more preferably in the range of from 5,000 to 20,000. When the mass average molecular weight is less than 5,000, the dispersion stability of the dispersed pigment may be degraded. And when it is more than 20,000, the resolvability of the alkali solution may be degraded, and its viscosity may increase.

The content of the polymer dispersion stabilizer to 100 parts by mass of the pigment is preferably in the range of 1 part by mass to 100 parts by mass, and more preferably in the range of 5 parts by mass to 50 parts by mass based on the solid content. When the content is less than 1 part by mass, the polymer dispersion stabilizer may not sufficiently stabilize the dispersion state. And when it is more than 100 parts by mass, the ink viscosity increases, and it may result in causing ejection failures and/or increase in its production cost.

—Pigment Dispersant—

The water-dispersible colorant in the third structure preferably contains a pigment dispersant. A preferred pigment dispersant is one selected from anion surfactants and nonionic surfactants that has an HLB value of 10 to 20.

Examples of the anion surfactants include polyoxyethylene alkyletheracetate; alkylbenzene sulfonates such as $NH_4$, Na and Ca; alkyldiphenylether disulfonates such as $NH_4$, Na and Ca; sodium dialkylsuccinate sulfonate; sodium naphthalene sulfonate formalin condensate; polyoxyethylene polycyclic phenylethersulfate esters such as $NH_4$ and Na; lauryl chlorides; polyoxyethylene alkyl ether sulfate; and oleic acids. Among those salts, sodium dioctyl sulfosuccinate salt and polyoxyethylene styrene phenylether sulfosuccinate ammonium salt are particularly preferable.

Examples of the nonionic surfactants having an HLB value of 10 to 20 include polyoxyethylene alkylether, polyoxyalkylene alkylether, polyoxyethylene polycyclic phenylether, sorbitan fatty acid ester, polyoxyethylene sorbitan fatty acid ester, alkylphenol ethoxylate, polyoxyethylene alkyl amine, polyoxyethylene alkylamide and acetylene glycol. Among those, polyoxyethylene laurylether, polyoxyethylene-β-naphthylether, polyoxyethylene sorbitan monoleate and polyoxyethylene styrene phenylether are particularly preferable.

The content of the dispersant to 100 parts by mass of the pigment is preferably in the range of 1 part by mass to 100 parts by mass, and more preferably in the range of 10 parts by mass to 50 parts by mass. When the content of the dispersant is insufficient, the pigment may not be sufficiently miniaturized. And when the content of the dispersant is too large, its excess component which is surplus thereof not adhering to the pigment, may adversely affect the property of the ink, causing bleeding and degradations in the water resistance and abrasion-resistance.

The dispersed pigment can be obtained by dissolving the pigment dispersant in an aquatic medium, adding the pigment, sufficiently moisturizing the mixture, and kneading/dispersing using a high-speed agitator such as a homogenizer, a dispersion machine such as a bead mill or ball mill, a mixing-dispersion kneader such as a roll mill using shear force, or an ultrasonic dispersion machine. Coarse particles are likely to exist after such kneading/dispersing process, and they often cause blocking of inkjet nozzles and/or ink supply routes. Thus, it is necessary that coarse particles having particle diameters of 1 μm or larger be removed using, for example, a filter or a centrifugal separator.

The average particle diameter ($D_{50}$) of the dispersed pigment in the ink is preferably 150 nm or smaller, and more preferably 100 nm or smaller. When the average particle diameter ($D_{50}$) is larger than 150 nm, the ejection stability may be drastically degraded, resulting in blocking of the inkjet nozzles and/or distorting ink ejection directions. On the other hand, when the average particle diameter ($D_{50}$) is 100 nm or smaller, the ejection stability as well as image saturation will be improved.

The content of the water-dispersible colorant in the recording ink is preferably in the range of 2% by mass to 15% by mass and more preferably in the range of 3% by mass to 12% by mass based on the solid content. When the content is less than 2% by mass, the ink color gamut and image densities may be drastically degraded. And when it is more than 15% by mass, ink viscosity increases, and it may result in the degradation of the ink ejection stability and increase in its production cost.

—Water-Dispersible Resin—

At least fluorine resin particulates are used as the water-dispersible resin because of their excellent film formability, or image formability, as well as excellent water repellency, water resistance and durability, and because they are effective means to record high density images having excellent color gamut and water resistance.

Preferred examples of the fluorine resin particulates include those having a fluoroolefin unit. Of such fluorine resin particulates, particulates of vinyl ether resins composed of fluoroolefin units and vinyl ether units are particularly preferably used.

The fluoroolefin unit is not particularly limited and can be appropriately selected depending on the purpose. Examples thereof include —$CF_2CF_2$—, —$CF_2CF(CF_2)$— and —$CF_2CFCl$—.

The vinyl ether unit is not particularly limited and can be appropriately selected depending on the purpose. Examples thereof include the compounds represented by the following structural formulas.

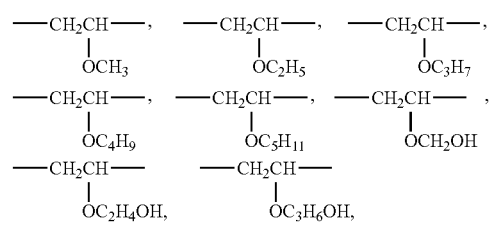

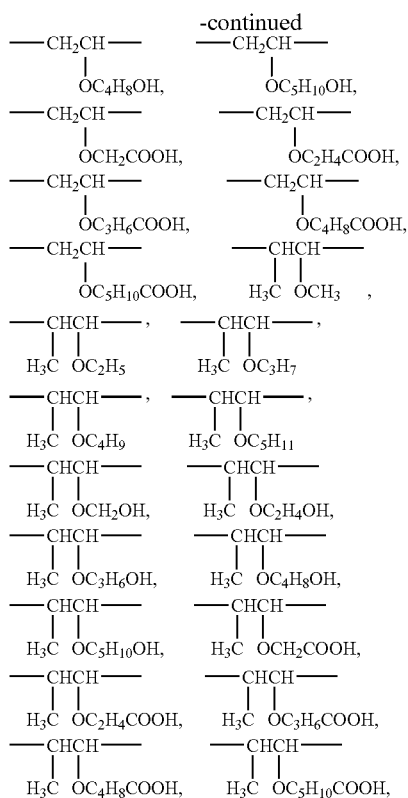

The particulates of the vinyl ether resins composed of fluoroolefin units and vinyl ether units are preferably alternating copolymers of the fluoroolefin units and vinyl ether units.

For such fluorine resin particulates, either those appropriately synthesized or commercially available products may be used. Examples of the commercially available products include FLUONATE FEM-500 and FEM-600, DICGUARD F-52S, F-90, F-90M and F-90N, and AQUAFURFURAN TE-5A (all manufactured by DAINIPPON INK AND CHEMICALS, INCORPORATED); LUMIFLON FE4300, FE4500 and FE4400, and ASAHICUARD AG-7105, AG-950, AG-7600, AG-7000 and AG-1100 (all manufactured by ASAHI GLASS CO., LTD.).

The fluorine resin particulates may be used in combination with a water-dispersible resin. In such case, the content of the fluorine resin particulates in the water-dispersible resin is preferably 50% by mass or more, more preferably 70% by mass or more and further preferably 80% by mass or more. And it is most preferred that the content substantially be 100% by mass.

The water-dispersible resin used in combination is not particularly limited, and can be selected according to the purpose. Examples thereof include condensed synthetic resins, polyaddition resins and natural polymer compounds.

Examples of the condensed synthetic resins include polyester resins, polyurethane resins, polyepoxy resins, polyamide resins, polyether resins and silicon resins. Examples of the polyaddition resins include polyolefin resins, polystyrene resins, polyvinyl alcohol resins, polyvinyl ester resins, polyacrylic acid resins and unsaturated carboxylic acid resins. Examples of the natural polymer compounds include celluloses, rosins and natural rubbers.

The water dispersible resin may be used as a homopolymer or may be copolymerized to be used as a complex resin. It can be formed into any one of single phase structures, core shell structures and power-feed emulsions.

Such water-dispersible resin can be selected from those themselves have hydrophilic groups and self-dispersibility and those themselves have no self-dispersibility while dispersibility is provided thereto by a means of a surfactant or a resin having hydrophilic groups. Among them, emulsions of the resin particles obtained by emulsification and/or suspension polymerization of an ionomer of polyester resin or polyurethane resin or an unsaturated monomer are preferable. In the emulsification polymerization of the unsaturated monomer, it is emulsification-polymerized in water in which the unsaturated monomer, a polymerization initiator, and the surfactant, a chain transfer agent, a chelating agent and a pH adjuster are added. Thus, the water dispersible resin can be easily obtained, and further, resin constitution can be easily changed, enabling to obtain desired property thereof.

Examples of the unsaturated monomer include unsaturated carboxylic acids, (meth)acrylic acid ester monomers, (meth)acrylic acid amide monomers, aromatic vinyl monomers, vinyl cyano compound monomers, vinyl monomers, allyl compound monomers, olefin monomers, diene monomers, oligomers having unsaturated carbon atoms. Those can be used alone or in combination. By using those monomers in combination, it is possible to flexibly modify the property of the resulted monomers. And by a means of polymerization/graft-polymerization using an oligomer polymerization initiator, it is also possible to improve the property of the resin.

Examples of the unsaturated carboxylic acids include acrylic acid, methacrylic acid, itaconic acid, fumaric acid and maleic acid.

Examples of the monofunctional (meth)acrylic acid esters include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethylaminoethyl methacrylate, methacryloxyethyltrimethyl ammonium salts, 3-methacryloxypropyltrimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethylaminoethyl acrylate and acryloxyethyltrimethyl ammonium salts.

Examples of the polyfunctional (meth)acrylic acid esters include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2"-bis(4-methacryloxydiethoxyphenyl)propane, trimethylol propane trimethacrylate, trimethylol ethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2"-bis(4-acryloxypropyloxyphenyl)propane, 2,2"-bis(4-acryloxydiethoxyphenyl)propane, trimethylol propane triacrylate, trimethylol ethane triacrylate, tetramethylol propane triacrylate, ditrimethylol tetraacrylate, tetramethylol methane tetraacrylate, pentaerythritol tetraacrylate and dipentaerythritol hexaacrylate.

Examples of the (meth)acrylic acid amide monomers include acrylamides, methacrylamides, N,N-dimethylacrylamides, methylenebisacrylamides and 2-acrylamide-2-methylpropane sulfonic acid.

Examples of the aromatic vinyl monomers include styrenes, α-methylstyrenes, vinyl toluenes, 4-t-butylstyrene, chlorostyrenes, vinyl anisoles, vinyl naphthalenes and divinyl benzenes.

Examples of the vinyl cyano compound monomers include acrylonitrile and methacrylonitrile.

Examples of the allyl compound monomers include allylsulfonic acid and salts thereof, allylamines, allyl chlorides, diallylamines, and diallyldimethyl ammonium salts.

Examples of the olefin monomers include ethylene and propylene.

Examples of the diene monomers include butadiene and chloroprene.

Examples of the vinyl monomers include vinyl acetates, vinylidene chlorides, vinyl chlorides, vinyl ethers, vinyl ketones, vinyl pyrrolidones, vinylsulfonic acids and salts thereof, vinyl trimethoxysilane and vinyl triethoxysilane.

Examples of the oligomers having unsaturated carbon atoms include styrene oligomers having a methacryloyl group, styrene-acrylonitrile oligomers having a methacryloyl group, methyl methacrylate oligomers having a methacryloyl group, methyl siloxane oligomers having a methacryloyl group and polyester oligomers having a acrylyl group.

Since breakdowns of the molecular chain, including dispersion breaking and hydrolysis, are caused under a strong alkaline or acidic environment, pH of the water dispersible resin is preferably in the range of from 4 to 12, and more preferably in the range of from 6 to 11 in terms of miscibility with the water dispersible colorant. It is further preferably in the range of 7 to 9.

The average-particle diameter ($D_{50}$) of the water-dispersible resin determines the viscosity of the dispersed liquid. Provided composition and the solid content of the dispersed liquid remain the same, particles having smaller diameters provide higher viscosity. The water-dispersible resin preferably has an average particle diameter ($D_{50}$) of 50 nm or larger for preventing inks using the water-dispersible resin from having excessively high viscosity. On the other hand, when the water-dispersible resin has an average particle diameter of several dozen micrometers, it cannot be used because the diameter is larger than the diameter of inkjet nozzles. And even if the average particle diameter of water-dispersible resin is smaller than the nozzles, excessively large particles thereof in an ink degrade its ejection stability. Thus, for preventing the degradation of the ejection stability, the average particle diameter ($D_{50}$) is preferably 200 nm or smaller and more preferably 150 nm or smaller.

The water-dispersible resin preferably functions as a means to fix the water-dispersible coloring material onto paper, and preferably improves the fixation characteristic of the colorant by filming under room temperature. Therefore, it is preferred that a minimum film formation temperature (MFT) of the water-dispersible resin be 30° C. or lower and more preferably 20° C. or lower.

And the glass transition temperature of the water-dispersible resin is preferably −30° C. or higher, because when the temperature is −40° C. or lower, the viscosity of the resin film increases, resulting in the generation of wrinkles on printed paper.

The content of the water-dispersible resin in the recording ink is preferably in the range of from 2% by mass to 30% by mass and more preferably in the range of 6% by mass to 25% by mass based on the solid content.

—Wetting Agent—

The recording ink of the present invention contains water as a liquid medium. To prevent the ink from drying, and to improve dispersion stability, the following wetting agent is used in the ink. The wetting agent is an effective means for preventing the degradations of the ink ejection stability and the resolvability, caused by water evaporation.

The wetting agent is not particularly limited and can be appropriately selected in accordance with the purpose. Examples thereof include polyalcohols, polyalcohol alkylethers, polyalcohol aryl ethers, nitrogen-containing heterocyclic compounds, amides, amines, sulfur-containing compounds, propylene carbonates, ethylene carbonic acids and other wetting agents. These may be used alone or in combination.

Examples of the polyalcohols include glycerine, diethylene glycol, 1,3-butanediol, 3-methyl-1,3-butanediol, triethylene glycol, propylene glycol, dipropylene glycol, trimethylol propane, trimethylol ethane, ethylene glycol, tripropylene glycol, tetraethylene glycol, hexylene glycol, polyethylene glycol, polypropylene glycol, 1,5-pentadiol, 1,6-hexanediol, glycerol, 1,2,6-hexanetriol, 1,2,4-butanetriol, 1,2,4-butanetriol, 1,2,3-butanetriol and petriol.

Examples of the polyvalent alcohol alkyl ether compounds include ethylene glycol monoethyl ether, ethylene glycol monobutyl ether, ethylene glycol monomethyl ether, diethylene glycol monoethyl ether, diethylene glycol monobutyl ether, tetraethylene glycol monomethyl ether and propylene glycol monoethyl ether.

Examples of the polyvalent alcohol aryl ethers include ethylene glycol monophenyl ether and ethylene glycol monobenzyl ether.

Examples of the nitrogen-containing heterocyclic compounds include 2-pyrrolidone, N-methyl-2-pyrrolidone, N-hydroxyethyl-2-pyrrolidone, 1,3-dimethylimidazolidinone, ε-caprolactam and γ-butyrolactone.

Examples of the amides include formamide, N-methylformamide and N,N-dimethylformamide.

Examples of the amines include monoethanolamine, diethanolamine, triethanolamine, monoethylamine, diethylamine and triethylamine.

Examples of the sulfur-containing compounds include dimethylsulfoxide, sulfolane and thiodiethanol.

Preferred examples of the other wetting agents include those having saccharides. Examples of the saccharides include monosaccharide, disaccharide, oligosaccharide (including trisaccharide and tetrasaccharide) and polysaccharide. Specific examples thereof include glucose, mannose, fructose, ribose, xylose, arabinose, galactose, maltose, cellobiose, lactose, sucrose, trehalose, and maltotriose. Herein, the term "polysaccharide" refers to saccharides in a broad sense, and it includes widespread natural saccharides such as α-cyclodextrins and celluloses. Examples of derivatives of such saccharides include reducing sugars thereof, including sugar alcohols which are generally represented as $HOCH_2(CHOH)_nCH_2OH$ (where n is an integer of 2 to 5), oxidized saccharides such as aldonic acids and uronic acids, amino acids and thio acids. Of those saccharides, the sugar alcohols are preferable. Specific examples thereof include maltitol and sorbit.

Of those wetting agents, glycerol, diethylene glycol, triethylene glycol, 1,3-butanediol, 3-methyl-1,3-butanediol, 2-pyrrolidone and N-methyl-2-pyrrolidone are preferable because they provide excellent storage stability and ejection stability.

The mass ratio of the pigment to the wetting agent particularly relates to the stability of ejecting ink drops from inkjet nozzles. When the formulation amount of the wetting agent in an ink is low relative to the content of solidified pigment, water contained in the ink evaporates from ink nozzles and/or ink ejecting systems, and it may result in the blocking of the nozzles.

The content of the wetting agent in the recording ink is preferably in the range of 20% by mass to 35% by mass and more preferably in the range of 22.5% by mass to 32.5% by mass. By adjusting the content in the ranges, it is possible to protect the ink from drying and improve the storage stability of the ink, and thus the reliability of the ink can be increased. When the content is less than 20% by mass, the ink around the nozzles easily dries, causing the blocking of the nozzles. When it exceeds 35% by mass, the drying characteristics on paper may degrade, and image quality may also degrade on regular paper.

—Surfactants—

The surfactant can be appropriately selected from those which will not impair the dispersion stability when used in combination with any colorant/wetting agent and have a low surface tension and a high leveling characteristic. It is preferably selected from one of silicone surfactants and fluorinated surfactants. Among them, the fluorinated surfactants are particularly preferable.

The fluorinated surfactant preferably has 2 to 16, and more preferably 4 to 16 carbon atoms substituted with fluorine atoms. When the number of carbon atoms substituted with fluorine atoms is less than two, the effect of fluorine is not obtained in some cases. When it is more than 16, problems such as degradation in the storage stability of the ink may occur.

Examples of the fluorinated surfactants include perfluoroalkyl sulfonic acid compounds, perfluoroalkyl carboxylic compounds, perfluoroalkyl phosphate ester compounds, perfluoroalkyl ethylene oxide adducts and polyoxyalkylene ether polymer compounds having perfluoroalkyl ether group at the side chain thereof. Among them, the polyoxyalkylene ether polymer compounds having perfluoroalkyl ether group at the side chain are particularly preferable for its low foaming property.

Examples of the perfluoroalkyl sulfonic acid compounds include perfluoroalkyl sulfonic acid and perfluoroalkyl sulfonate salts.

Examples of the perfluoroalkyl carboxylic compounds include perfluoroalkyl carboxylic acid and perfluoroalkyl carboxylate salts.

Examples of the perfluoroalkyl phosphate ester compounds include perfluoroalkyl phosphate ester and salts of perfluoroalkyl phosphate ester.

Examples of the polyoxyalkylene ether polymer compounds having perfluoroalkyl ether group at side chain include polyoxyalkylene ether polymers having perfluoroalkyl ether group at side chain, sulfates of polyoxyalkylene ether polymers having perfluoroalkyl ether group at side chain and salts of polyoxyalkylene ether polymers having perfluoroalkyl ether group at side chain.

Examples of the counterions of the salts in these fluorinated surfactants include Li, Na, K, $NH_4$, $NH_3CH_2CH_2OH$, $NH_2(CH_2CH_2OH)_2$ and $NH(CH_2CH_2OH)_3$.

The fluorinated surfactants can be selected from either those appropriately synthesized or commercially available products.

Examples of the commercially available products include Surflon S-111, S-112, S-113, S-121, S-131, S-132, S-141, S-145 (manufactured by Asahi Glass Co., Ltd.), Fullard FC-93, FC-95, FC-98, FC-129, FC-135, FC-170C, FC-430, FC-431 (supplied from Sumitomo 3M Ltd.), Megafac F-470, F1405, F-474 (manufactured by Dainippon Ink And Chemicals, Incorporated), Zonyl TBS, FSP, FSA, FSN-100, FSN, FSO-100, FSO, FS-300, UR (manufactured by DuPont), FT-110, FT-250, FT-251, FT-400S, FT-150, FT-400SW (manufactured by NEOS Company Limited) and PF-151N (manufactured by Omnova Inc.). Of those products, FS-300 (manufactured by DuPont), FT-110, ET-250, FT-251, FT-400S, FT-150, FT-400SW (manufactured by NEOS Company Limited) and PF-151N (manufactured by Omnova Inc.) are particularly preferable as they can provide excellent image quality, and particularly they can improve color gamut of recorded images and enable the ink to be uniformly absorbed in paper.

Specific examples of the fluorinated surfactants include those represented by the following structural formulas.

(1) Anionic Fluorinated Surfactants

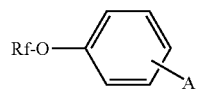

Where Rf represents a mixture of fluorine containing hydrophobic groups represented by the following structural formula. And where A represents $-SO_3X$, $-COOX$ or $-PO_3X$ (X is counteranion, and specifically it may be a hydrogen atom, Li, Na, K, $NH_4$, $NH_3CH_2CH_2OH$, $NH_2(CH_2CH_2OH)_2$, or $NH(CH_2CH_2OH)_3$).

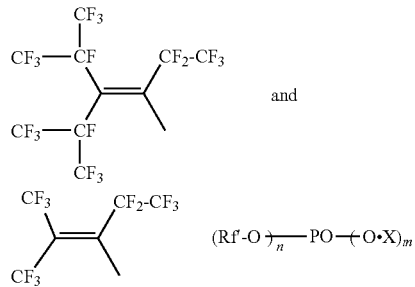

Where Rf represents a fluorine containing group represented by the following structural formula. Where X represents the same as described above. And where "n" represents an integer of 1 or 2, and "m" represents 2-n.

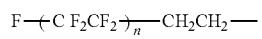

Where "n" represents an integer of 3 to 10.

$Rf-S-CH_2CH_2-COO.X$

Where Rf and X are the same as described above.

$Rf-SO_3.X$

Where Rf and X are the same as described above.

(2) Nonionic Fluorinated Surfactants

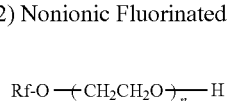

Where Rf is the same as described above. And where "n" represents an integer of 5 to 20.

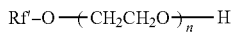

Where Rf' is the same as described above. And where "n" represents an integer of 1 to 40.

(3) Amphoteric Fluorinated Surfactant

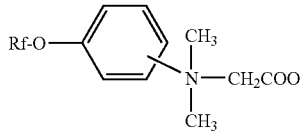

Where Rf is the same as described above.

(4) Oligomer-Type Fluorinated Surfactant

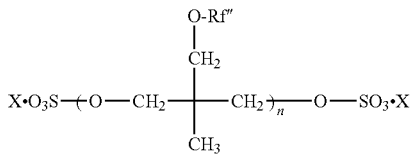

Where Rf" represents a fluorine-containing group represented by the following structural formula, "n" represents an integer of 0 to 10, and X is the same as described above.

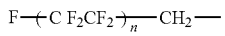

Where "n" represents an integer of 1 to 4.

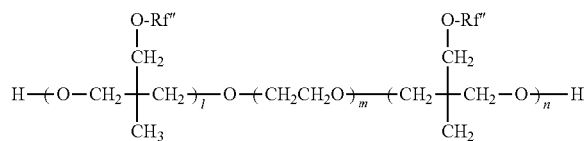

Where Rf" is the same as defined above, and "l", "m" and "n" each represent an integer of 0 to 10.

The silicone surfactant is not particularly limited, and can be appropriately selected in accordance with the purpose. It is preferred that it be selected from those which are not decomposed in a high pH environment. Examples of such surfactants include side chain modified polydimethylsiloxane, chain ends modified polydimethylsiloxane, chain end modified polydimethylsiloxane, and sidechain ends modified polydimethylsiloxane. Modifying groups having a polyoxyethylene group or a polyoxyethylene polyoxypropylene group are particularly preferable because of their excellent characteristics as an aqueous surfactant.

Such surfactants may be selected from those appropriately synthesized or commercially available products.

Examples of the commercially available products include those manufactured by BYK Japan KK, Shin-Etsu Silicones Co., Ltd., and Dow Corning Tray Co., Ltd.

The polyether modified silicone surfactant is not particularly limited and can be appropriately selected in accordance with the purpose. Examples thereof include compounds obtained by introducing the polyalkylene oxide structure represented by the following structural formula into Si side chain of dimethyl polysiloxane.

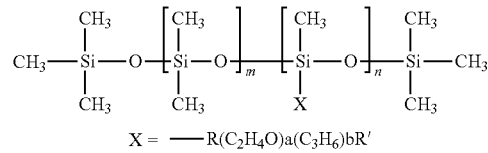

Where "m", "n", "a" and "b" represent integers. And where R and R' represent an alkyl group and an alkylene group respectively.

The polyether modified silicone compounds may be selected from commercially available products. Examples thereof include KF-618, KF-642 and KF643 (manufactured by Shin-Etsu Chemical Co., Ltd.).

The content of the surfactant in the recording ink is preferably in the range of from 0.01% by mass to 3.0% by mass and more preferably in the range of from 0.5% by mass to 2% by mass.

When the content is less than 0.01% by mass, the effect of adding the surfactant may not be obtained. When it exceeds 3.0% by mass, the permeability of the ink to a recording medium may excessively increase, resulting in reduction in the image density and causing the ink to pass through to the other side of the recording medium.

—Penetrating Agent—

It is preferred that at least a polyol compound having a solubility to 20° C. water of 0.2% by mass to 5.0% by mass be contained in the ink as a penetrating agent. Examples of the polyol compound include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol and 2-ethyl-1,3-hexanediol.

Of those diols, 2-ethyl-1,3-hexanediol and 2,2,4-trimethyl-1,3-pentanediol are particularly preferable.

The other penetrating agents which can be used in combination are not particularly limited, and can be appropriately selected in accordance with the purpose. They can be selected from those which are soluble to the ink and can have desired properties. Examples thereof include alkyls or arylethers of polyalcohols, including diethylene glycol monophenyl ether, ethylene glycol monophenyl ether, ethylene glycol monoallyl ether, diethylene glycol monobutyl ether, propylene glycol monobutyl ether and tetraethylene glycol chlorophenyl ether; and lower alcohols such as ethanols.

The content of the penetrating agent in the recording ink is preferably in the range of 0.1% by mass to 4.0% by mass. When the content is less than 0.1% by mass, the ink drying speed may be slowed, resulting in occurrence of bleeding. And when it is more than 4.0% by mass, the dispersion stability of the colorant may be degraded, resulting in frequent occurrences of nozzle blocking and excessive increase of the permeability to a recording medium, which causes the degradation of the image density and the ink to pass through to the other side of the recording medium.

The other components are not particularly limited, and can be appropriately selected in accordance with the necessity. Examples thereof include pH adjusters, preservatives/antifungal agents, chelate agents, antirusts, antioxidants, ultraviolet ray absorbers, oxygen absorbers and photo stabilizers.

The pH adjuster is particularly limited provided it can adjust pH to a desired level in the range of 7 to 11 without adversely affecting the recording ink, and it can be appropriately selected in accordance with the purpose. Examples therefor include alcohol amine's, alkali metal hydroxide, ammonium hydroxide, phosphonium hydroxide and alkali metal carbonate salts. When the pH level is lower than 7 or higher than 11, the ink containing it excessively melts an inkjet had and ink supply unit, and that may result in the change in ink property, causing ink leaking and blocking ink nozzles.

Examples of the alcohol amines include diethanolamine, triethanolamine and 2-amino-2-ethyl-1,3-propanediol.

Examples of the hydroxide of alkali metal elements includes lithium hydroxide, sodium hydroxide and potassium hydroxide.

Examples of the hydroxide of ammonium include ammonium hydroxide, quaternary ammonium hydroxide and quaternary phosphonium hydroxide.

Examples of the carbonate salts of alkali metals include lithium carbonate, sodium carbonate and potassium carbonate.

Examples of the preservatives/anti-fungal agents include sodium dehydroacetate, sodium sorbate, sodium 2-pyridinethiol-1-oxide, sodium benzoate and sodium pentachlorophenol.

Examples of the chelate agents include sodium ethylenediaminetetraacetate, sodium nitrilotriacetate, sodium hydroxyethyl ethylene diamine nitrilotriacetate, sodium diethylenetriamine pentaacetic and sodium uramil diacetate.

Examples of the antirusts include acidic sulfite salts, sodium thiosulfate, ammonium thiodiglycolate, diisopropylammonium nitrate, pentaerythritol tetranitrate and cyclohexylammonium nitrate.

Examples of the antioxidants include phenol antioxidants (including hindered phenol antioxidants), amine antioxidants, sulfur antioxidants and phosphorous antioxidants.

Examples of the phenol antioxidants (including hindered phenol antioxidants) include butylated hydroxyanisole,
2,6-di-tert-butyl-4-ethylphenol,
stearyl-β-(3,5-di-tert-butyl-4-hydroxyphenyl)propionate,
2,2'-methylenebis(4-methyl-6-tert-butylphenol),
2,2'-methylenebis(4-ethyl-6-tert-butylphenol),
4,4'-butylidenebis(3-methyl-6-tert-butylphenol),
3,9-bis(1,1-dimethyl-2-[β-(3-tert-butyl-4-hydroxy-5-methylphenyl)propionyloxy]ethyl]2,4,8,10-tetraixaspiro[5,5] undecane,
1,1,3-tris(2-methyl-4-hydroxy-5-tert-butylphenyl)butane,
1,3,5-trimethyl-2,4,6-tris(3,5-di-tert-butyl-4-hydroxybenzyl)benzene and
tetraxis[methylene-3-(3',5'-di-tert-butyl-4-hydroxyphenyl) propionate]methane.

Examples of the amine antioxidants include phenyl-β-naphthylamine, α-naphthylamine, N,N'-di-sec-butyl-p-phenylenediamine, phenothiazine, N,N'-diphenyl-p-phenylenediamine, 2,6-tert-butyl-p-cresol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetraxis[methylene-3-(3,5-di-tert-butyl-4-dihydroxyphenyl)propionate]methane and 1,1, 3-tris(3-methyl-4-hydroxy-5-tert-butylphenyl)butane.

Examples of the sulfur antioxidants include dilauryl 3,3'-thiodipropionate, distearyl thiodipropionate, lauryl stearyl thiodipropionate, dimyristyl 3,3'-thiodipropionate, distearyl β,β'-thiodipropionate, 2-mercaptobenzimidazole and dilauryl sulfite.

Examples of the phosphorous antioxidants include triphenyl phosphite, octadecyl phosphite, triisodecyl phosphite, trilauryl trithiophosphite, and trionylphenyl phosphite.

Examples of the ultraviolet ray absorbers include benzophenone based ultraviolet ray absorbers, benzotriazole based ultraviolet ray absorbers, salicylate based ultraviolet ray absorbers, cyanoacrylate based ultraviolet ray absorbers, and nickel complex salt based ultraviolet ray absorbers.

Examples of the benzophenone ultraviolet ray absorbers include
2-hydroxy-4-n-octoxybenzophenone,
2-hydroxy-4-n-dodecyloxybenzophenone, 2,4-dihydroxybenzophenone,
2-hydroxy-4-methoxybenzophenone, and
2,2',4,4'-tetrahydroxybenzophenone.

Examples of the benzotriazole ultraviolet ray absorbers include
2-(2'-hydroxy-5'-tert-octylphenyl)benzotriazole,
2-(2'-hydroxy-5'-methylphenyl)benzotriazole,
2-(2'-hydroxy-4'-octoxyphenyl)benzotriazole, and
2-(2'-hydroxy-3'-tert-butyl-5'-methylphenyl)-5-chlorobenzotriazole.

Examples of the salicylate ultraviolet ray absorbers include, for example, phenyl salicylate, p-tert-butylphenyl salicylate, and p-octylphenyl salicylate.

Examples of the cyanoacrylate ultraviolet ray absorbers include
ethyl-2-cyano-3,3'-diphenyl acrylate,
methyl-2-cyano-3-methyl-3-(p-methoxyphenyl)acrylate, and
butyl-2-cyano-3-methyl-3-(p-methoxyphenyl)acrylate.

Examples of the nickel complex salt ultraviolet ray absorbers include nickel bis(octylphenyl)sulfide,
2,2'-thiobis(4-tert-octylphelate)-n-butylamine nickel (II),
2,2'-thiobis(4-tert-octylphelate)-2-ethylhexylamine nickel (II) and
2,2'-thiobis(4-tert-octylphelate)triethanolamine nickel (II).

The recording ink of the present invention is obtained by dispersing/melting a water-dispersible colorant, a water-dispersible resin, a wetting agent, a surfactant, water and other components in accordance with necessity in a water-based medium. They may further be stirred/mixed in accordance with necessity. Those components can be dispersed using, for example, a sand mill, a homogenizer, a ball mill, a paint shaker or an ultrasonic dispersing machine. The components can be stirred/mixed using, for example, a regular stirrer equipped with stirring wings, a magnetic stirrer or a high speed dispersing machine.

The properties of the recording ink of the present invention is not particularly limited, and can be appropriately adjusted in accordance with the purpose, while it is preferred that its properties including viscosity, surface tension and pH be in the following ranges.

The viscosity of the recording ink at 25° C. is preferably in the range of from 5 mPa·s to 20 mPa·s, and more preferably in the range of from 10 mPa·s to 20 mPa·s. When the viscosity is 5 mPa·s or more, the ink can provide higher image density and better image quality. While excellent ejection stability is maintained by adjusting the ink viscosity at 20 mPa·s or lower.

The viscosity at 25° C. can be measured with, for example, RL-500 (a viscometer manufactured by TOKI SANGYO CO., LTD.).

The surface tension of the recording ink at 25° C. is preferably 35 mN/m or lower and more preferably 30 mN/m or lower. When the surface tension is more than 35 mN/m, the levelling of the ink on the recording medium may be slowed, resulting in longer drying time.

The coloration of the recording-ink of the present invention is not particularly limited, can be appropriately selected in accordance with the purpose. Examples thereof include yellow, magenta, cyan and black. Multicolor images can be recorded using an ink set having two or more such colors in combination. Full color images can be recorded using an ink set having all the colors in combination.

The recording ink of the present invention can be suitably used for printers having any types of inkjet heads. Examples of the inkjet heads include a so-called piezoelectric type inkjet head where ink drops are ejected by changing the volume of an ink flow path by deforming a vibration plate which forms a wall of the ink flow path and which is deformed using a piezoelectric element as a means to apply pressure to the ink in the ink flow path (see JP-A No. 02-51734); or a so-called thermal inkjet head where bubbles are generated by heating the ink in the ink flow path using an exothermic resistive element (see JP-A No. 61-59911); or an electrostatic inkjet head where the electrode and the vibration plate which forms the wall of the ink flow path are disposed in opposed positions, and the volume in the ink flow path is changed to eject the ink by an electrostatic power generated between the electrode and the vibration plate (see JP-A No. 06-71882).

The recording ink of the present invention can be suitably used as an ink for inkjet recording, as well as for variety of usages including fountain pens, ball-points, markers and felt pens. Particularly, it can be preferably used in inkjet image forming apparatuses such as printers that heat a recording medium and ink to 50° C. to 200° C. before/after printing as a means to promote fixing of a recorded image. The ink of the present invention can particularly preferably be used for the ink/media set, ink cartridge, ink recorded matter, inkjet recording apparatus and inkjet recording method of the present invention.

(Ink/Media Set)

The ink/media set of the present invention contains the recording ink and the recording medium of the present invention.

<Recording Medium>

The recording medium is not particularly limited and can be appropriately selected in accordance with the purpose. Suitable examples thereof include regular paper, glossy coated printing paper, special paper, fabric, film, OHP sheet and regular printing paper.

In order to obtain a recorded matter with excellent image quality, the recording medium should have a base and a coating which is provided on at least one side of the base, wherein the transfer amount of pure water to the recording medium should be in the range of from 2 ml/m$^2$ to 35 ml/m$^2$ when measured at a contacting time of 100 ms and with a dynamic scanning absorptometer, and the transfer amount of pure water to the recording medium is in the range of from 3 ml/m$^2$ to 40 ml/m$^2$ when measured at a contacting time of 400 ms.

The transfer amount of purified water to the recording medium at the contacting time of 100 ms is preferably in the range of 1 mL/m$^2$ to 5 mL/m$^2$, and the transfer amount of purified water to the recording medium at the contacting time of 400 ms is in the range of 3 mL/m$^2$ to 10 mL/m$^2$ mL/m.

When the transfer amount of the ink and purified water at the contacting time of 100 ms is insufficient, the beading of the recording medium may easily occur. When it is too large, the diameter of dots forming recorded images on the recording medium may not be sufficient.

When the transfer amount at the contacting time of 400 ms is insufficient, the recording medium cannot provide sufficiently fast drying speed, and thus spur marks may be easily generated and. On the other hand, when it is excessively large, the recording medium may not provide a excellent glossy surface on a dried recorded image.

Here, the dynamic scanning absorptometer (stated in JPA's Voluntary Action Plan and Report of Energy Situation in the Pulp and Paper Industry in Japan vol. 48, 88-92, May, 1994, Sigenori Kukan), or DSA, is a device capable of precisely measuring the liquid absorption in an extremely short period of time. With the dynamic scanning absorptometer, the liquid absorption rate of the recording medium can be automatically measured by directly measuring a liquid absorption rate from a movement of a meniscus in a capillary, by forming a sample into a disc form, spirally scanning a liquid absorption head, automatically changing the scanning rate in accordance with a predetermined pattern, and repeating the measurement procedure a desired number of times on only one sample. A liquid supply head to a paper sample is connected to the capillary through a Teflon (registered trade name) tube, and the position of the meniscus in the capillary is automatically read with an optical sensor. Specifically, using the dynamic scanning absorptometer (K350 series D type supplied from Kyowa Seiko Co., Ltd.), the transfer amount of purified water can be measured. The transfer amounts at the contact time of 100 ms and 400 ms can be calculated by interpolation based on measured values of the transfer amounts at contact time adjacent to each contact time.

—Support—

The support is not particularly limited, can be appropriately selected depending on the purpose, and includes, for example, paper whose major ingredient is wood fiber and sheet-shaped substances such as nonwoven fabrics whose major ingredients are wood fibers and synthetic fibers.

The paper is not particularly limited and can be appropriately selected in accordance with the purpose. Examples thereof include wood pulps and used paper pulps. Examples of the wood pulps include broad leaved tree bleached kraft pulps (LBKP), needle leaved tree bleached kraft pulps (NBKP), NBSP, LBSP, GP and TMP.

Raw materials of the used paper pulps include paper material used for super white paper, white paper with rule marks, cream white paper, card paper, super white paper, medium white paper, simili paper, color white paper, Kent paper, white art paper, special high cut paper, other high cut paper, and paper used for newspaper and magazines. Standards of those types of paper are specified in Used Paper Standard Quality Specification table issued by the Paper Recycling Promotion Center. More specific examples of those types of paper include variety of types of non-coated PC paper, printer sheets such as thermal paper and pressure-sensitive paper which are generally used in IT devices; variety of types of used OA sheets such as PPC sheets; variety of types of coated paper including art paper, coated paper, finely coated paper and mat paper; and variety of types of non-coated paper such as quality paper, color high quality paper, notepaper, letter paper, packing paper, facsimile paper, medium quality paper, newspaper, fancy-figured paper, super ceremony paper, structure paper, pure white rolling paper, milk cartons, chemical pulp paper and high process yield pulp-containing paper. These may be used alone or in combination.

The used paper pulp is generally produced by a combination of the following 4 steps:

(1) a separating step in which used paper is crumbled into fibers by a mechanical force generated in a pulper and by a chemical reaction, and then printed ink is separated from the fibers;

(2) a cleaning step in which contained foreign matters (plastics and the like) and dusts are removed with a screen/cleaner;

(3) a deinking step in which the printed ink separated from the fibers using a surfactant is removed outside by a floatation method or a washing method; and (4) a bleaching step in which fibers are treated with an oxidation reaction or a reduction reaction to make the fibers whiter.

When the used paper pulp is mixed, the mixed amount of the used paper pulp per the total amount of the pulps is preferably 40% or less for preventing paper made of the pulps from curling after recorded.

Examples of internally added fillers used in the support include known white pigments. Examples of the white pigments include white inorganic pigments such as light calcium carbonates, heavy calcium carbonates, kaolin, clays, talcs, calcium sulfates, barium sulfates, titanium dioxides, zinc oxides, zinc sulfides, zinc carbonates, satin whites, aluminium silicates, diatom earth, calcium silicates, magnesium silicates, synthetic silicas, aluminas, lithopones, zeolites, magnesium carbonates and magnesium carbonates; and organic pigments such as styrene based plastic pigments, acrylic plastic pigments, polyethylene, microcapsules, urea resins and melamine resins. These may be used alone or in combination.

Examples of an internally added sizing agent used in making the support include neutral rosin sizing agents for neutral paper making; alkenyl succinic acid anhydrate (ASA); alkyl ketene dimers (AKD); and petroleum resin based sizing agents. Among those, the neutral rosin sizing agent and alkenyl succinic acid anhydrate are particularly preferable. Although a small amount of the alkyl ketene dimer is needed to provide sufficient size effect, it may not be preferable to added even the small amount thereof. This is because adding the alkyl ketene dimer decreases the friction coefficient of the surfaces of recording paper (or medium), making the medium easier to slip on a recording medium feeding device and feeding the medium difficult.

The thickness of the support is not particularly limited and can be adjusted at an appropriate level in accordance with the purpose, while it is preferably in the range of 50 μm to 300 μm. The basis weight of the support is preferably in the range of 45 g/m² to 290 g/m².

—Coating Layer—

The coating layer contains a pigment and a binder, and it further contains a surfactant and other ingredients in accordance with necessity.

As the pigment, inorganic pigments may be used alone or in combination with organic pigments.

Examples of the inorganic pigments include kaolins, heavy calcium carbonates, light calcium carbonates, calcium sulfites, amorphous silicas, titanium whites, magnesium carbonates, titanium dioxides, aluminium hydroxides, calcium hydroxides, magnesium hydroxides, zinc hydroxides and chlorites. Among them, the kaolins are preferable for its capability to provide excellent gloss surfaces on recorded ink images. It enables to obtain a recorded image that is as excellent quality as an image printed by offset printing.

Examples of the kaolins include delaminated kaolin, baked kaolin and engineered kaolin obtained by surface modification. In order to obtain desirable gloss surfaces, it is preferred that a kaolin having a particle diameter distribution in which particles having a diameter of 2 mm or smaller is 80% by mass or more occupy 50% by mass or more in the entire kaolin.

The added amount of kaolin is preferably 50 parts by mass or more per 100 parts by mass of the binder. When the added amount is less than 50 parts by mass, excellent gloss surfaces may not be obtained. The upper limit of the added amount is not particularly provided, while it is more preferably 90 parts by mass or less when coating adequacies such as fluidity and, particularly, thickening property under high shearing force of the kaolin are taken into account.

Examples of the organic pigments include water-soluble dispersions of, for example, styrene-acryl copolymer particles, styrene-butadiene copolymer particles, polystyrene particles and polyethylene particles. Two or more such organic pigments may be mixed in combination.

The added amount of the organic pigment is preferably in the range of 2 parts by mass to 20 parts by mass relative to 100 parts by mass of all pigments contained in the coating layer. The organic pigment which can provide excellent gloss surfaces and its specific gravity relatively smaller than that of the inorganic pigment enables to obtain bulky and highly glossy coating layer having a good surface coating property. When the added amount is less than 2 parts by mass, the above-stated effects may not be obtained. When it exceeds 20 parts by mass, the fluidity of the coating solution may be degraded, resulting in the reduction of productivity of the coating layers and increase in its cost.

The organic pigment may be in a form of a compact type, a hollow type and a doughnut type, while the hollow type preferably having an average particle diameter ($D_{50}$) of 0.2 μm to 3.0 μm and more preferably having a void ratio of 40% or more is preferable when the balance between gloss surface and coating ability and flowability of the coating liquid is taken into account.

For the binder, it is preferable to use a water-based resin.

For the water-based resin, at least one of water-soluble resins and water dispersible resins can be suitably used. The water-soluble resins are not particularly limited, and can be appropriately selected in accordance with the purpose. Examples thereof include polyvinyl alcohol, modified polyvinyl alcohols such as cation modified polyvinyl alcohol and acetal modified polyvinyl alcohol; polyvinyl pyrrolidone and modified polyvinyl pyrrolidone such as copolymers of polyvinyl pyrrolidone and vinyl acetate, copolymers of vinyl pyrrolidone and dimethylaminoethyl methacrylate, copolymers of quaternized vinyl pyrrolidone and dimethylaminoethyl methacrylate and copolymers of vinyl pyrrolidone and methacrylamidepropyl trimethyl ammonium chloride; celluloses such as carboxymethylcellulose, hydroxyethylcellulose and hydroxypropylcellulose; modified cellulose such as cationized hydroxyethylcellulose; polyester, polyacrylic acid (ester), melamine resins or modified products thereof, synthetic resins such as copolymers of polyester and polyurethane; poly(meth)acrylic acid, poly(meth)acrylamide, oxidized starch, phosphate esterified starch, self-modified starch, cationized starch or various modified starch, polyethylene oxide, soda polyacrylate and soda alginate. These may be used alone or in combination.

Among them, polyvinyl alcohol, cation modified polyvinyl alcohol, acetal modified polyvinyl alcohol, polyester, polyurethane, copolymers of polyester and polyurethane and the like are particularly preferable for improving the ink absorbency.

The water-dispersible resins are not particularly limited, and can be appropriately selected in accordance with the purpose. Examples thereof include polyvinyl acetate, copolymers of ethylene and vinyl acetate, polystyrene, copolymers of styrene and (meth)acrylic acid, copolymers of (meth)acrylate ester, copolymers of vinyl acetate and (meth)acrylate ester, styrene-butadiene copolymers, ethylene-propylene copolymers and silicone-acryl based copolymers. Crosslinking agents such as methylolized melamine, methylolized urea, methylolized hydroxypropylene urea and isocyanate may be contained. Copolymers having a unit such as N-methylol acrylamide and self cross-linking ability may also be used. Two or more such water-based resins can be used in combination.

The added amount of the water-based resin per 100 parts by mass of the pigment is preferably in the range of 2 parts by mass to 100 parts by mass, and more preferably in the range of 3 parts by mass to 50 parts by mass. The added amount of the water-based resin is determined so that the absorbency property to the recording medium of the ink is adjusted in a desired range.

When the water-dispersible colorant is used as the colorant, a cationic organic compound may also be used. The cationic organic compound is not particularly limited and can be appropriately selected in accordance with the purpose. Examples thereof include primary to tertiary amines, monomers, oligomers and polymers of quaternary ammonium salts which form insoluble salts by reacting with a sulfone group, carboxyl group or amino group in a direct dye or an acidic dye contained in a water-soluble ink. Among them, the oligomer or the polymer is preferable.

Examples of the cationic organic compounds include dimethylamine epichlorohydrin polycondensates, dimethylamine ammonia epichlorohydrin condensates, poly(trimethylaminoethyl methacrylate methyl sulfate salt), diallylamine hydrochloride salts, acrylamide copolymers, poly(diallylamine hydrochloride salt sulfur dioxide), polyallylamine hydrochloride salts, poly(diallylamine hydrochloride salt diallylamine hydrochloride salt), acrylamide diallylamine copolymers, polyvinylamine copolymers, dicyandiamide ammonium chloride urea formaldehyde condensates, polyalkylenepolyamine dicyandiamide ammonium salt condensates, dimethyldiallyl ammonium chloride polydiallylmethylamine hydrochloride salts, poly(diallyldimethyl ammonium chloride), poly(diallyldimethyl ammonium chloride sulfur dioxide), poly(diallyldimethyl ammonium chloride diallylamine hydrochloride salt derivative), acrylamide diallyldimethyl ammonium chloride copolymers, acrylate salts, acrylamide diallylamine hydrochloride salt copolymers, ethyleneimine derivatives such as polyethyleneimine and acrylamine polymers and modified polyethyleneimine alkylene oxide. These may be used alone or in combination.

Among them, it is preferable to use the low molecular weight cationic organic compounds such as dimethylamine epichlorohydrin polycondensate and polyallylamine hydrochloride salt in combination with the cationic organic compound with a relatively high molecular weight, including poly(diallyldimethyl ammonium chloride). By using those in combination, the image density is enhanced, and also it is possible to reduce the occurrence of feathering compared with using only one of them.

The cation equivalent of the cationic organic compound, measured by a colloid titration technique using polyvinyl potassium sulfate and toluidine blue, is preferably in the range of 3 meq/g to 8 meq/g. When the cation equivalent is in that range, excellent ink properties can be obtained in the range of the dried adhesion amount mentioned below.

When the cation equivalent is measured by the colloid titration technique, the cationic organic compound is diluted with distilled water so that the solid content is 0.1% by mass, while pH is not adjusted.

The dried adhesion amount of the cationic organic compound is preferably in the range of $0.3 \text{ g/m}^2$ to $2.0 \text{ g/m}^2$. When the dried adhesion amount of the cationic organic compound is less than $0.3 \text{ g/m}^2$, the image density may not be sufficiently improved and the occurrence of feathering may not be prevented.

The surfactant is not particularly limited and can be appropriately selected in accordance with the purpose. It can be selected from any one of anionic surfactants, cationic surfactants, ampholytic surfactants and nonionic surfactants. Among those, the nonionic surfactants are particularly preferable. By adding the surfactant, the water resistance of the image can be enhanced, the image density can be improved and occurrence of bleeding can be prevented.

Examples of the nonionic surfactants include higher alcohol ethylene oxide adducts, alkylphenol ethylene oxide adducts, fatty acid ethylene oxide adducts, polyvalent alcohol fatty acid ester ethylene oxide adducts, higher aliphatic amine ethylene oxide adducts, fatty acid amide ethylene oxide adducts, ethylene oxide adducts of fats and oils, polypropylene glycol ethylene oxide adducts, fatty acid ester of glycerol, fatty acid ester of pentaerythritol, fatty acid ester of sorbitol and sorbitan, fatty acid ester of sucrose, alkyl ether of polyvalent alcohol and fatty acid amide of alkanolamine. These may be used alone or in combination.

The polyvalent alcohols are not particularly limited and can be appropriately selected in accordance with the purpose. Examples thereof include glycerols, trimethylolpropanes, pentaerythrits, sorbitols and sucroses. An ethylene oxide adduct, those in which a part thereof is substituted with alkylene oxide such as propylene oxide or butylene oxide in the range in which water solubility can be kept are available. The replacement rate is preferably 50% or less. HLB (ratio of the hydrophilicity to the hydrophobicity) of the nonionic surfactant is preferably in the range of from 4 to 15 and more preferably in the range of from 7 to 13.

The added amount of the surfactant per 100 parts by mass of the cationic organic compound is preferably in the range of 0 part by mass to 10 parts by mass and more preferably in the range of 0.1 parts by mass to 1.0 part by mass.

Other necessary ingredients may be added to the coating layer, provided that the ingredients are within the scope of the present invention and can achieve desired effects. Examples of the other components include additives such as alumina powders, pH adjusters, preservatives and antioxidants.

The method of forming the coating layer is not particularly limited, and can be appropriately selected in accordance with the purpose. For example, it can be formed by impregnating the support with a coating solution or applying the coating solution on the support. The method of the impregnation/application is not particularly limited and can be appropriately selected in accordance with the purpose. For example, a coating machine therefor can be selected from various coating machines including a conventional size press, a gate roll size press, a film transfer size press, a blade coater, a rod coater, an air knife coater and a curtain coater. However, in terms of cost, the coating solution should be impregnated or deposited using the conventional size press, the gate roll size press or the film transfer size press installed in a paper making machine, and finished with an on-machine.

The amount of the coating solution to be provided on the support is not particularly limited and can be adjusted at an appropriate level in accordance with the purpose, while it is preferably in the range of $0.5 \text{ g/m}^2$ to $20 \text{ g/m}^2$ and more preferably in the range of $1 \text{ g/m}^2$ to $15 \text{ g/m}^2$ based on the solid content.

Subsequently, the thus formed coating layer may be dried in accordance with necessity. In this case, drying temperature is not particularly limited and can be an appropriate level in accordance with the purpose, while it is preferably in the range of about 100° C. to 250° C.

The recording medium may contain a back layer on a backside of the support and another layer in between the support and the coating layer or in between the support and the back layer. And a protection layer may formed.

The recording medium can be selected from variety of inkjet recording paper as well as from other commercially available products including regular printing paper, coated paper for offset printing and coated paper for gravure printing.

Commercially available coated paper for printing include those used for industrial printing and publications, including cast-coated paper, art paper of A0 and A1 sizes, A2 size coated paper, A3 size coated paper, B2 size coated paper, light weight coated paper and lightly coated paper. Those types of paper are used for offset printing, gravure printing or the like.

More specifically, examples thereof include AURORA-COATER (available from Nippon Paper Group, Inc.) and POD GLOSSCOAT (available from Oji paper Co., Ltd.).

(Ink Cartridge)

The ink cartridge of the present invention contains a container for housing the recording ink of the present invention, and further contains appropriately selected other members in accordance with the necessity.

The container is not particularly limited, and its shape, structure, size and material can be appropriately determined in accordance with the purpose. Suitable examples thereof include ink containers at least having an ink bag made of, for example, aluminum laminate film or resin film.

Figure 2:
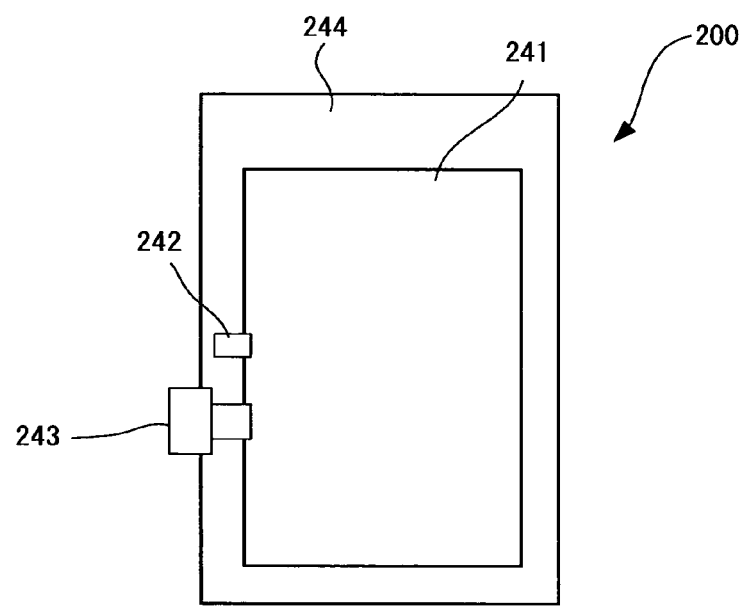
FIG. 2 is a schematic view showing one example of a case and the ink cartridge of FIG. 1 contained therein.

Subsequently, the ink cartridge will be described with reference to FIGS. 1 and 2. FIG. 1 is a view exemplarily showing the ink cartridge of the present invention. FIG. 2 is a view exemplarily showing a case (or an external container) housing the ink cartridge 200 of FIG. 1.

As shown in FIG. 1, ink is filled in the ink cartridge 200 from an ink inlet 242 into an ink bag 241, air/gas existing therein is deaerated, and then the ink inlet 242 is thermally fused to be closed. When used, the ink cartridge 200 supplies ink to an inkjet recording apparatus through a needle coming through an ink outlet 243 which is a rubber member.

The ink bag 241 is a packing member made of, for example, aluminium laminate film having no air permeability. As shown in FIG. 2, the ink bag 241 is usually housed in a plastic cartridge case 244 and detachably loaded in various inkjet recording apparatuses to be used.

The ink cartridge of the present invention contains the recording ink/ink set of the present invention and detachably loaded in various inkjet recording apparatus to be used. It is particularly preferred that the ink cartridge of the present invention be detachably loaded in the inkjet recording apparatus of the present invention, described below.

(Inkjet Recording Apparatus and Inkjet Recording Method)

The inkjet recording apparatus of the present invention contains at least an ink ejecting unit, and it further contains appropriately selected other units such as an impulse generating unit and a control unit in accordance with the necessity.

The inkjet recording method of the present invention contains at least an ink ejecting step, and it further contains appropriately selected other steps such as an impulse generating step and a controlling step in accordance with the necessity.

The inkjet recording method of the present invention can be suitably performed with the inkjet recording apparatus of the present invention. The ink ejecting step can be suitably performed with the ink ejecting unit. And the forementioned other steps can be suitably performed with the forementioned other units accordingly.

—Ink Flying Step and Ink Flying Unit—

The ink ejecting step is for ejecting drops of the recording ink of the present invention by applying impulse thereto to thereby form an image.

The ink ejecting unit is for ejecting drops of the recording ink of the present invention by applying impulse thereto to thereby form an image. The ink ejection unit is not particularly limited. Examples thereof include variety of nozzles for ejecting ink drops.

The impulse can be generated with, for example, the impulse generating unit. The impulse is not particularly limited and can be appropriately selected in accordance with the purpose. Examples thereof include heat, pressure, vibration, and light. Those may be used alone or in combination. Among those, heat and pressure are suitable.

Examples of the impulse generating unit include heaters, pressure devices, piezoelectric devices, vibration generators, ultrasonic oscillators and lights. More specific examples include piezoelectric actuators including piezoelectric devices, thermal actuators utilizing the phase change by generating liquid film boiling with an electric-heat converter such as a heat element, shape memory alloy actuators utilizing the metal phase change generated by temperature variation, and electrostatic actuators utilizing an electrostatic force.

The method of ejecting the ink drops of the recording ink is not particularly limited and can be selected in accordance with a selected impulse to be applied. For example, when heat is used as the impulse, heat energy generated correspondingly to recording signals is imparted through, for example, a thermal head to the recording ink housed in a recording head to thereby generate bubbles in the recording ink, and then the recording ink is ejected in the form of drops from nozzles at the recording head by the pressure of the bubbles. When pressure is used as the impulse, the ink drops can be ejected by, for example, applying a voltage to the piezoelectric element provided to a so-called pressure room located in the ink flow path of the recording head so that the piezoelectric element is bended and thus the volume of the pressure room is reduced, ejecting the recording ink in the form of drops from the nozzles.

The amount of the ink drops is preferably in the range of from 3 pl to 40 pl. The ejection speed of the ink drops is preferably in the range of from 5 m/s to 20 m/s. The frequency of the impulse applied to the ink is preferably 1 kHz or higher. It is preferred that formed images have a resolution of 300 dpi or higher.

The control unit is not particularly limited and can be appropriately selected in accordance with the purpose, provided that it is suitable for controlling the movements of the above-stated units. Examples thereof include variety of instruments such as sequencers and computers.

Figure 3:
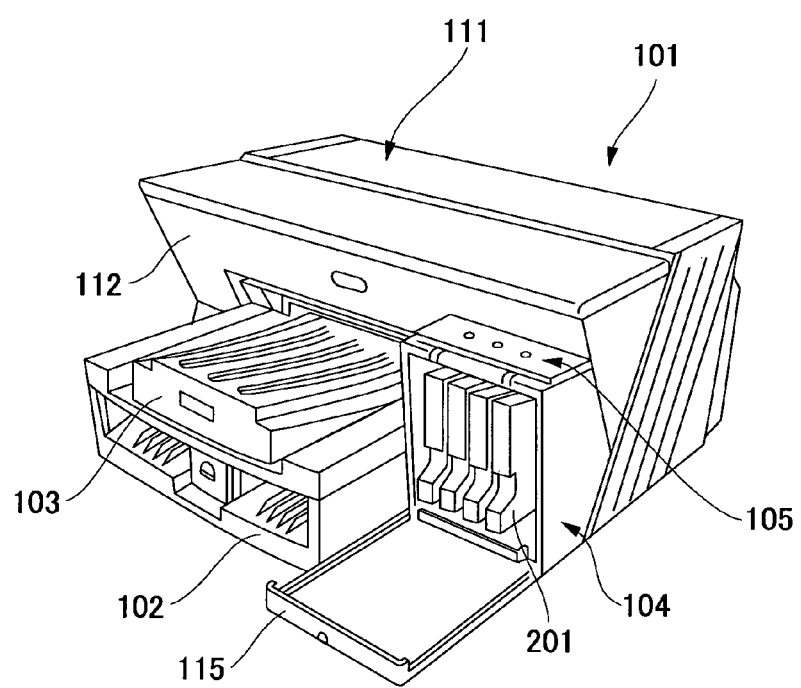
FIG. 3 is a perspective view exemplarily showing an inkjet recording apparatus with a cover for an ink cartridge-loading section opened.

An embodiment of carrying out the inkjet recording method of the present invention using the inkjet recording apparatus of the present invention will be described with reference to the drawings. As shown in FIG. 3, the inkjet recording apparatus contains a body 101, a paper feeding tray 102 for loading paper attached to the body 101, a copy receiving tray 103, attached to the body 101, for stocking the paper on which images are recorded (formed), and an ink cartridge loading section 104. In FIG. 3, 111 is an upper cover, and 112 indicates the front side of the inkjet recording apparatus.

An operation section 105 including operation keys and/or displays is provided on the ink cartridge loading section 104.

The ink cartridge loading section 104 has an openable and closable front cover 115 provided for enabling to exchange an ink cartridge 201.

Figure 4:
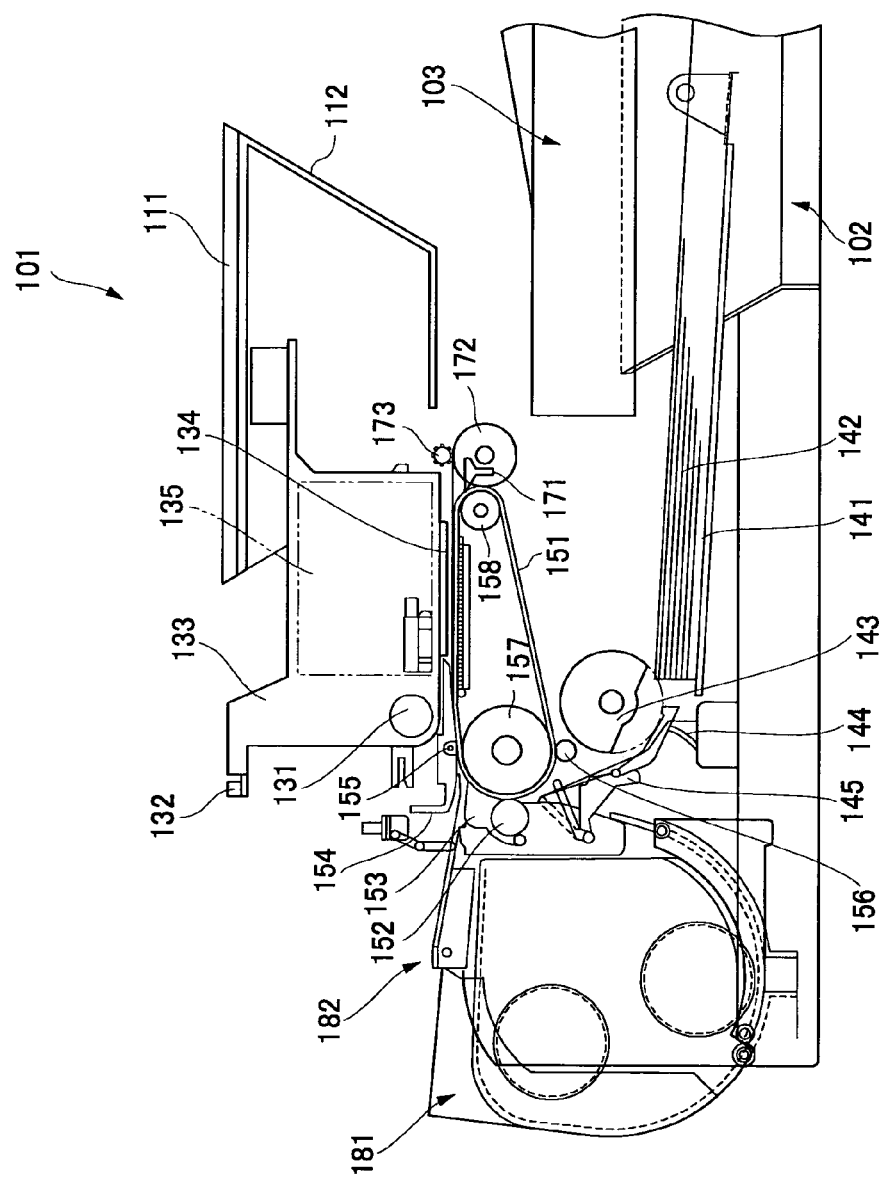
FIG. 4 is a schematic view showing one example of the entire configuration of an inkjet recording apparatus.
Figure 5:
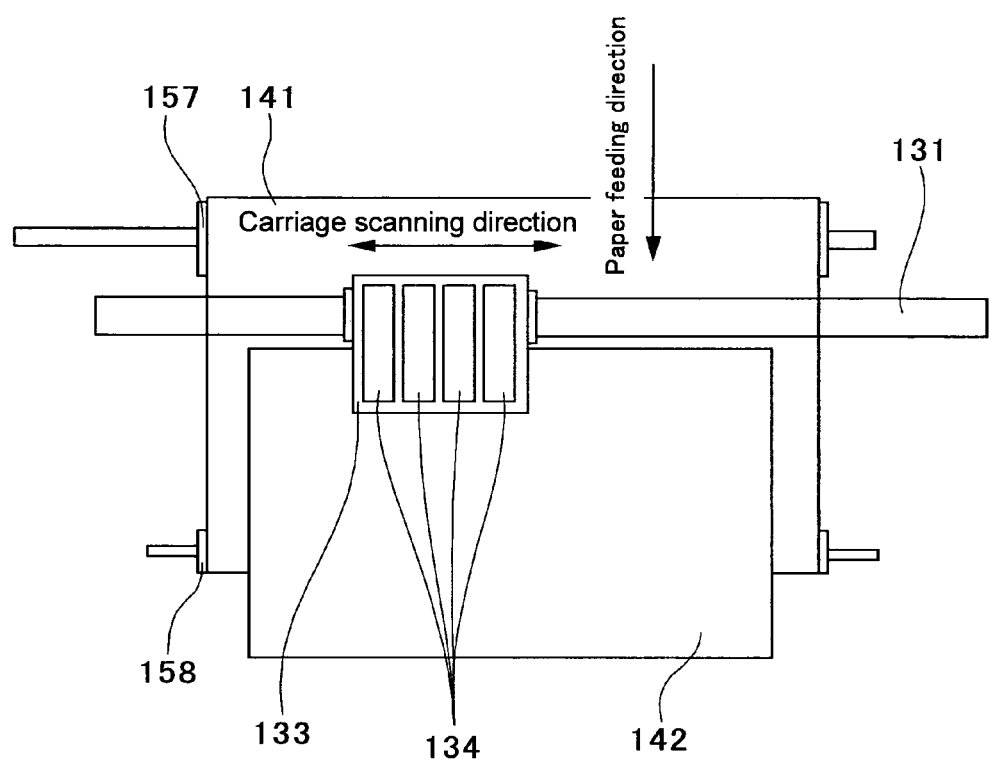
FIG. 5 is a magnified view schematically showing one example of the inkjet head in the present invention.

As shown in FIGS. 4 and 5, a carriage 133 is retained with a guide rod 131 and a stay 132 in the main body 101 so that the carriage 133 can slidably retained in the primary scanning direction. The guide rod 131 is beard with two side plates (not shown) provided right and left of the guide rod 131. The carriage 133 is driven with a main scanning motor (not shown) in the direction indicated by the arrow shown in FIG. 5.

In the carriage 133, recording heads 134 which are composed of four heads for ejecting recording inks of yellow (Y), cyan (C), magenta (M) and black (B) are arranged in the direction intersecting with the primary scanning direction. The ink drop ejecting direction of the recording heads 134 is directed downward.

Examples of such inkjet heads which constitute the recording heads 134 include those equipped with a energy generating means to eject ink drops, including piezoelectric actuators such as piezoelectric elements, thermal actuators utilizing the phase change by generating liquid film boiling with an electric-heat converter such as a heat element, shape memory alloy actuators utilizing the metal phase change generated by temperature variation, and electrostatic actuators utilizing an electrostatic force.

The carriage 133 contains sub-tanks 135 for each color ink for supplying them to the recording head 134. Each color of the recording ink of the present invention is supplied from the ink cartridge 201 of the present invention, provided in the ink cartridge loading section 105, to the sub-tanks 135 through ink supplying tubes (not shown).

As a means to supply paper 142 loaded on a paper loading section (or a pressuring plate) 141 which is located at the copy receiving tray 103, emilunar rollers (or paper supply rollers 143) and a separation pad 144 are provided. The paper supply rollers 143 are to separate and feed a sheet of paper one-by-one from loaded paper 142. The separation pad 144 is facing the paper supply rollers 143 and composed of a material having a large friction coefficient. The separation pad 144 is biased toward the paper supply rollers 143.

Paper 142 supplied by the means to supply paper is fed under the recording head 134 with the following means; a feeing belt 151 for feeding paper 142 by electrostatic absorption; a counter roller 152 for feeding paper 142 from the means through a guide 145 by sandwiching paper with the feeding belt 151; a feeding guide 153 for rotating fed paper 90° so that its longitudinal direction is changed from substantially perpendicularly to parallel to the direction of feeding belt 151; and a tip-pressurizing roller 155 which is a part of pressuring section 154 and provided on the feeding belt 151. The feeding belt 151 is provided with a charge roller 156 as a charging unit for charging the surface of the belt.

The feeding belt 151 is an endless belt, provided and tensioned between a feeding roller 157 and a tension roller 158, and capable of to be rotated in the paper feeding direction. The feeding belt 151 contains, for example, a resin surface layer which serves as a surface for transporting paper, has a thickness of around 40 μm and an uncontrolled resistance and is made of, for example, a copolymer of tetrafluoroethylene and ethylene, or ETFE, and a back layer (such as middle resistance layer or grounding layer) which is made of the same material as the resin surface layer and has a resistance controlled with carbon. A guide member 161 corresponding to the printing region of the recording head 134 is provided on the back layer of the feeding belt 151. A separation claw 171, paper discharging rollers 172 and a paper discharging roller 173 are provided as means to discharge paper 142 on which an image has been recorded with the recording head 134. The separation claw 171 serves as a means to separate paper 142 from the feeding belt 151. And a copy receiving tray 103 for discharged paper is provided under the paper discharging roller 172.

A both-sides paper feeding unit 181 is detachably attached to the backside of the body 101. The both-sides paper feeding unit 181 takes paper 142 which is returned from the feeding belt 151 by reversely rotating the belt, reverses that taken paper, and then feed the reversed paper in between the counter roller 152 and the feeding belt 151. A manual paper feeding section 182 is provided at the upper area of the both-sides paper feeding unit 181.

In this inkjet recording apparatus, paper 142 is separated and fed one-by-one with the means to supply paper with its longitudinal direction directed to the substantially perpendicularly to the feeding direction, guided with the guide 145, and fed by sandwiched in between the feeding belt 151 and the counter roller 152. The edge of that paper is further guided with the feeding guide 153 to be mounted on the feeding belt 151 by pressurizing it with the tip-pressurizing roller 155, and then its longitudinal direction is rotated about 90° against the feeding direction.

At that time, the feeding belt 157 is charged by the charge roller 156, and paper 142 is electrostatically attached to the feeding belt 151 to be transported. The recording head 134 is driven in accordance with image signals while the carriage 133 moves, ejects ink drops onto paper 142, when whose moving is stopped to be provided with the ink drops, to record one line of letters, characters or images, and then paper 142 is fed by a predetermined distance to be ready for recording the next line. A recording operation is terminated when the inkjet recoding apparatus receives either a recording termination signal or a signal indicating that the bottom edge of paper 142 is reached in the recording region. Then, paper 142 is discharged to the copy receiving tray 103.

When that the remaining amount of the recording ink in the sub-tank 135 reaches close to empty is detected, a given amount of the recording ink is supplied from the ink cartridge 201 to the sub-tank 135.

When the recording ink contained in the ink cartridge 201 of the inkjet recording apparatus is finished, only the ink bag in the ink cartridge 201 needs replacing. The ink bag can be taken out therefrom by opening the ink cartridge 201. The ink cartridge 201 can maintain its capability of stably supplying recording ink when it is vertically placed at the front area of the of the body 101. In that case, the ink cartridge 201 can be easily replaced even when the space above the body 101 is not opened in its surrounding circumstance—such as when it is placed in a shelf or when something is on the body 101.

Here, the example in which the recording ink of the present invention is applied to a serial type (shuttle type) inkjet recording apparatus in which the carriage scans is described, while the recording ink can likewise be applied to line type inkjet recording apparatuses having a line type head.

The inkjet recording apparatus and the inkjet recording method of the present invention can be applied to various recordings using an inkjet recording system. Particularly suitable examples to which they can be suitably applied include printers for inkjet recording, facsimile apparatuses, photocopiers and printer/facsimile/photocopy complex machines.

(Ink Recorded Matter)

The ink recorded matter of the present invention is recorded by the means of the inkjet recording apparatus and the inkjet recording method of the present invention.

The ink recorded matter of the present invention is composed of a recording medium and an image formed on the recording medium using the recording ink of the present invention.

The ink recorded matter of the present invention is composed of a recording medium of the ink/media set of the present invention and an image formed on the recording medium using the recording ink of the ink/media set of the present invention.

The recording medium is not particularly limited and can be appropriately selected in accordance with the purpose. Examples thereof include regular paper, gloss paper, special paper, regular printing paper, fabrics, films and OHP sheets. These may be used alone or in combination.

The ink record matter can provide high image quality without bleeding and excellent over-time stability, and thus it can be suitably used for various usages including source materials on which various letters/characters and/or images are recorded.

EXAMPLES

Hereinafter, with referring to Examples and Comparative Examples, the invention is explained in detail and the following Examples and Comparative Examples should not be construed as limiting the scope of this invention.

Preparation Example 1

Preparation of Aqueous Solution a of Water-Soluble Polymer Compound 10.0 parts by mass of alpha-olefin/maleic anhydride copolymer (T-YP112, manufactured by SEIKO PMC Corporation) represented by the following structural formula 1, which has an olefin chain with 20 to 24 carbon atoms, an acid value of 190 mgKOH/g and a weight-average molecular weight of 10,000

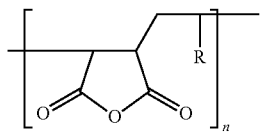

Structural formula (1)

17.34 parts by mass of normal LiOH aqueous solution having an acid value 1.2 times higher than alpha-olefin/maleic anhydride copolymer of the structural formula 1

72.66 parts by mass of ion-exchanged water

To prepare aqueous solution A of a water-soluble polymer compound, the above-stated components were heated and mixed using a mixer, alpha-olefin/maleic anhydride copolymer represented by the structural formula 1 was dissolved into the thus obtained mixture, and then a very small amount of undissolved articles existed in the solution was removed by filtering using a filter having an average pore diameter of 5 µm.

Preparation Example 2

Preparation of Dispersed Solution of Surface-Treated Black Pigment

Into 3,000 ml of 2.5 N sodium sulphate solution, 90 g of carbon black having a CTAB specific surface area of 150 m²/g and a DBP oil absorption amount of 100 mL/100 g was added. The thus obtained solution was stirred at 300 rpm under 60° C., and reacted for 10 hours. Thus, it was subjected to an oxidation treatment. The thus obtained reaction solution was filtrated to obtain filtrated carbon black. The obtained carbon black was neutralized with sodium hydroxide solution and subjected to an ultra-filtration.

The resulted carbon black was washed and dried, and then it was dispersed in purified water. The solid content thereof in the thus obtained solution was adjusted to 30% by mass, and it was sufficiently stirred. Thereby a dispersed solution of black pigment was obtained. The average particle diameter ($D_{50}$) of the dispersed pigment was measured, revealing it was 103 nm. To measure the average particle diameter ($D_{50}$), NANOTRAC UPA-EX150 (a particle size analyzer manufactured by NIKKISO Co., Ltd.) was used.

Preparation Example 3

Preparation of Magenta Pigment-Containing Polymer Particulates Dispersed in Water <Preparation of Polymer Solution A>

Into a 1 L flask which was equipped with a mechanical stirrer, a thermometer, a nitrogen gas introducing tube, a reflux tube and a drop funnel and was sufficiently charged with nitrogen gas, 11.2 g of styrene, 2.8 g of acrylic acid, 12.0 g of lauryl methacrylate, 4.0 g of polyethylene glycol methacrylate, 4.0 g of styrene macromer and 0.4 g of mercaptoethanol were placed. Then, they were mixed in the flask and heated to 65° C. Subsequently, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercaptoethanol, 2.4 g of azobismethyl valeronitrile and 18 g of methyl ethyl ketone was added dropwise into the flask over 2.5 hours. After dripping, another mixed solution of 0.8 g of azobismethyl valeronitrile and 18 g of methyl ethyl ketone was added dropwise into the flask over 0.5 hours. After maturing at 65° C. for 1 hour, 0.8 g of azobismethyl valeronitrile was added, and then the mixture was further matured for 1 hour. Then, 364 g of methyl ethyl ketone was added into the flask to prepare 800 g of polymer solution A having a concentration of 50% by mass.

<Preparation of Pigment-Containing Polymer Particulates Dispersed in Water>

The following ingredients were sufficiently mixed: 28 g of polymer solution A, 42 g of C.I. pigment red 122, 13.6 g of 1 mol/L potassium hydroxide aqueous solution, 20 g of methyl ethyl ketone and 13.6 g of ion-exchanged water. Then, the thus obtained mixture was kneaded using a roll mill. The thus obtained paste was placed into 200 g of purified water, and the resulted mixture was sufficiently mixed. Then, methyl ethyl ketone and water were removed therefrom using an evaporator. In order to remove coarse particles from the resulted dispersed solution, it was subjected to a pressure filtration using a polyvinylidene-fluoride membrane filter which had an average pore diameter of 5.0 µm. Thus obtained magenta polymer particulates dispersed in water had 15% by mass of the pigment and 20% by mass of the solid content. The average particle diameter ($D_{50}$) of the thus obtained dispersed pigment was measured, revealing it was 145 nm. To measure the average particle diameter ($D_{50}$), NANOTRAC UPA-EX150 (a particle size analyzer manufactured by NIKKISO Co., Ltd.) was used.

Preparation Example 4

Preparation of Dispersed Solution of Yellow Pigment Surfactant 30.0 parts by mass of a monosazo yellow pigment (C. I. pigment yellow 74 manufactured by Dainichiseika Color & Chemicals Mfg. Co., Ltd.)

10.0 parts by mass of polyoxyethylene styrene phenylether (NOIGEN EA-177, a nonionic surfactant manufactured by Dai-ichi Kogyo Seiyaku Co., Ltd., having an HLB value of 15.7)

60.0 parts by mass of ion-exchanged water

The surfactant was dissolved into that ion-exchanged water. Then, the pigment was mixed into the mixture. The ingredients of the resulted mixture which had sufficient moisture were dispersed at 2,000 rpm for 2 hours using a wet dispersion machine (DYNO-MILL KDLA, manufactured by WAB Co., Ltd.) equipped with zirconia beads 0.5 mm in diameter. Thereby a primary dispersed pigment was obtained. Subsequently, 4.26 parts by mass of TAKELAC W-5661 (a water-soluble polyurethane resin manufactured by MITSUI TAKEDA CHEMICALS, INC., having 35.2% by mass of an active component, an acid value of 40 mgKOH/g and weight average molecular weight of 18,000) was added as an aqueous solution of water-soluble polymer compound to the primary dispersed pigment. The thus obtained mixture was sufficiently mixed, and thereby a dispersed solution of yellow pigment surfactant was obtained. The average particle diameter ($D_{50}$) of the thus obtained dispersed pigment was measured, revealing it was 62 nm. To measure the average particle diameter ($D_{50}$), NANOTRAC UPA-EX150 (a particle size analyzer manufactured by NIKKISO Co., Ltd.) was used.

Preparation Example 5

Preparation of Dispersed Solution of Magenta Pigment Surfactant 30.0 parts by mass of a quinacridone pigment (C. I. pigment red 122 manufactured by Dainichiseika Color & Chemicals Mfg. Co., Ltd.)

10.0 parts by mass of polyoxyethylene-p-naphthylether (RT-100, a nonionic surfactant manufactured by Takemoto Yushi Co., Ltd., having an HLB value of 18.5)

60.0 parts by mass of ion-exchanged water

The surfactant was dissolved into that ion-exchanged water. Then, the pigment was mixed into the mixture. The ingredients of the resulted mixture which had sufficient moisture were dispersed at 2,000 rpm for 2 hours using a wet dispersion machine (DYNO-MILL KDLA, manufactured by WAB Co., Ltd.) equipped with zirconia beads 0.5 mm in diameter. Thereby a primary dispersed pigment was obtained. Subsequently, 7.14 parts by mass of JC-05 (a water-soluble styrene-(meth)acrylic copolymer manufactured by SEIKO PMC Corporation, having 21% by mass of an active component, an acid value of 170 mgKOH/g and a weight average molecular weight of 16,000) was added into the primary dispersed pigment. They were sufficiently mixed, and thereby a dispersed solution of magenta pigment surfactant was obtained. The average particle diameter ($D_{50}$) of the thus obtained dispersed pigment was measured, revealing it was 83 nm. To measure the average particle diameter ($D_{50}$), NANOTRAC UPA-EX150 (a particle size analyzer manufactured by NIKKISO Co., Ltd.) was used.

Preparation Example 6

Preparation of Dispersed Solution A of Cyan Pigment Surfactant 30.0 parts by mass of phthalocyanine pigment (C. I. pigment blue 15:3 manufactured by Dainichiseika Color & Chemicals Mfg. Co., Ltd.)

10.0 parts by mass of polyoxyethylene laurylether (DK-SNL-450, a nonionic surfactant manufactured by Dai-ichi Kogyo Seiyaku Co., Ltd., having an HLB value of 18.3)

60.0 parts by mass of ion-exchanged water

The surfactant was dissolved into that ion-exchanged water. Then, the pigment was mixed into the mixture. The ingredients of the resulted mixture which had sufficient moisture were dispersed at 2,000 rpm for 2 hours using a wet dispersion machine (DYNO-MILL KDLA, manufactured by WAB Co., Ltd.) equipped with zirconia beads 0.5 mm in diameter. Thereby a primary dispersed pigment was obtained.

Subsequently, 7.51 parts by mass of the aqueous solution A of water-soluble polymer compound of Preparation Example 1 and 2.51 parts by mass of NICHEGO POLYESTER W-0030 (a water-soluble polyester resin manufactured by Nippon Synthetic Chemical Industry Co., Ltd., having 29.9% by mass of an active component, an acid value of 100 mgKOH/g and a weight average molecular weight of 7,000) were added into the primary dispersed pigment. The resulted mixture was sufficiently mixed, and thereby dispersed solution A of cyan pigment surfactant was obtained. The average particle diameter ($D_{50}$) of the dispersed pigment was measured, revealing it was 78 nm. To measure the average particle diameter ($D_{50}$), NANOTRAC UPA-EX150 (a particle size analyzer manufactured by NIKKISO Co., Ltd.) was used.

Preparation Example 7

Preparation of Dispersed Solution B of Cyan Pigment Surfactant 30.0 parts by mass of phthalocyanine pigment (C. I. pigment blue 15:3 manufactured by Dainichiseika Color & Chemicals Mfg. Co., Ltd.)

10.0 parts by mass of polyoxyethylene styrene phenylether (NOIGEN EA-177, a nonionic surfactant manufactured by Dai-ichi Kogyo Seiyaku Co., Ltd., having an HLB value of 15.7)

60.0 parts by mass of ion-exchanged water

The surfactant was dissolved into that ion-exchanged water. Then, the pigment was mixed into the mixture. The ingredients of the resulted mixture which had sufficient moisture were dispersed at 2,000 rpm for 2 hours using a wet dispersion machine (DYNO-MILL KDLA, manufactured by WAB Co., Ltd.) equipped with zirconia beads 0.5 mm in diameter. Thereby a primary dispersed pigment was obtained.

Subsequently, 15.0 parts by mass of the aqueous solution A of water-soluble polymer compound of Preparation Example 1 was added in the primary dispersed pigment. They were sufficiently mixed, and thereby dispersed solution B of cyan pigment surfactant was obtained. The average particle diameter ($D_{50}$) of the thus obtained dispersed pigment was measured, revealing it was 80 nm. To measure the average particle diameter ($D_{50}$), NANOTRAC UPA-EX150 (a particle size analyzer manufactured by NIKKISO Co., Ltd.) was used.

Preparation Example 8

Preparation of Dispersed Solution C of Cyan Pigment Surfactant 30.0 parts by mass of phthalocyanine pigment (C. I. pigment blue 15:3 manufactured by Dainichiseika Color & Chemicals Mfg. Co., Ltd.)
10.0 parts by mass of polyoxyethylene laurylether (DK-SNL-450, a nonionic surfactant manufactured by Dai-ichi Kogyo Seiyaku Co., Ltd., having an HLB value of 18.3)
60.0 parts by mass of ion-exchanged water The surfactant was dissolved into that ion-exchanged water. Then, the pigment was mixed into the mixture. The ingredients of the resulted mixture which had sufficient moisture were dispersed at 2,000 rpm for 2 hours using the wet dispersion machine (DYNO-MILL KDLA, manufactured by WAB Co., Ltd.) equipped with the zirconia beads 0.5 mm in diameter. Thereby a dispersed solution C of cyan pigment surfactant was obtained. The average particle diameter ($D_{50}$) of the thus obtained dispersed pigment was measured, revealing it was 75 nm. To measure the average particle diameter ($D_{50}$), NANOTRAC UPA-EX150 (a particle size analyzer manufactured by NIKKISO Co., Ltd.) was used.

Examples 1 to 12 and Comparative Examples 1 to 7

Preparation of Recording Ink

Recording inks were obtained as follows. The ingredients for each Example/Comparative Example, the wetting agent, penetrating agent, surfactant, fungicide and water, shown in the following Tables 1 to 4 were uniformly mixed for 1 hour. Water-dispersible resins were added to each of the thus obtained mixed solutions, and the each mixture was mixed for 1 hour. Furthermore, pigment dispersed solutions and deforming agents were added thereto and mixed for 1 hour. In order to remove coarse particles and foreign matters from the resulted dispersed solution, it was subjected to a pressure filtration using a polyvinylidene-fluoride membrane filter which had an average pore diameter of 5.0 μm. Thereby recording inks of Examples 1 to 12 and Comparative Examples 1 to 7 were obtained.

TABLE 1

| | Ingredients (% by mass) | Example 1 | Example 2 | Example 3 | Example 4 | Example 5 | Example 6 |
|---|---|---|---|---|---|---|---|
| Dispersed Solution of Pigment | Dispersed Solution of Surface-Treated Black Pigment (Preparation Example 2) | 26.7 | — | — | — | — | — |
| | Dispersed Solution of Magenta Pigment-Containing Polymer Particulates (Preparation Example 3) | — | 40 | — | — | — | — |
| | Dispersed Solution of Yellow Pigment Surfactant (Preparation Example 4) | — | — | 17.4 | — | — | — |
| | Dispersed Solution of Magenta Pigment Surfactant (Preparation Example 5) | — | — | — | 25 | — | — |
| | Dispersed Solution A of Cyan Pigment Surfactant (Preparation Example 6) | — | — | — | — | 14.7 | — |
| | Dispersed Solution B of Cyan Pigment Surfactant (Preparation Example 7) | — | — | — | — | — | 19.2 |
| | Dispersed Solution C of Cyan Pigment Surfactant (Preparation Example 8) | — | — | — | — | — | — |
| Water-dispersible resin | Fluorine resin emulsion A | 8 | 24 | — | — | 32 | — |
| | Fluorine resin emulsion B | — | — | 30 | 28 | — | 30 |
| | Fluorine resin emulsion C | — | — | — | — | — | — |
| | Polyurethane Emulsion | — | — | — | — | — | — |
| Wetting agent | 3-methyl-1,3-butanediol | 18.9 | — | — | — | — | 6.5 |
| | Ttriethylene glycol | — | — | 8 | — | — | — |
| | 1,3-butanediol | — | 16.8 | 13 | 19.5 | 19.5 | 13 |
| | N-methyl-2-pyrrolidone | — | — | — | — | — | — |
| | Glycerine | 9.46 | 8.4 | 7 | 6.5 | 6.5 | 6.5 |
| Penetrating agent | Octanediol | 2 | 2 | 2 | 2 | — | 1 |
| | 1,2-hexanediol | — | — | — | — | 2 | 1 |
| Surfactant | POLYFOX PF-151N | — | — | 2 | — | 1 | — |
| | ZONYL FS-300 | 2.5 | 2.5 | — | 2.5 | 1.5 | 2.5 |
| | SOFTANOL EP-5035 | — | — | — | — | — | — |
| Fungicide | Proxel GXL | 0.05 | 0.05 | 0.05 | 0.05 | 0.05 | 0.05 |
| Deforming agent | Silicone deforming agent KM-72F | 0.1 | 0.1 | 0.1 | 0.1 | 0.1 | 0.1 |
| | Pure Water | Residual quantity | Residual quantity | Residual quantity | Residual quantity | Residual quantity | Residual quantity |
| | Total (% by mass) | 100 | 100 | 100 | 100 | 100 | 100 |

TABLE 2

| | Ingredients (% by mass) | Example 7 | Example 8 | Example 9 | Example 10 | Example 11 |
|---|---|---|---|---|---|---|
| Dispersed Solution of Pigment | Dispersed Solution of Surface-Treated Black Pigment (Preparation Example 2) | 30 | — | — | — | — |
| | Dispersed Solution of Magenta Pigment-Containing Polymer Participates (Preparation Example 3) | — | — | — | 10.43 | — |
| | Dispersed Solution of Yellow Pigment Surfactant (Preparation Example 4) | — | — | — | — | — |
| | Dispersed Solution of Magenta Pigment Surfactant (Preparation Example 5) | — | — | 21.43 | — | — |
| | Dispersed Solution A of Cyan Pigment Surfactant (Preparation Example 6) | — | — | — | — | — |
| | Dispersed Solution B of Cyan Pigment Surfactant (Preparation Example 7) | — | 19.16 | — | — | — |
| | Dispersed Solution C of Cyan Pigment Surfactant (Preparation Example 8) | — | — | — | — | 13.33 |
| Water-dispersible resin | Fluorine resin emulsion A | 18 | 40 | — | — | 16 |
| | Fluorine resin emulsion B | — | — | — | 48 | — |
| | Fluorine resin emulsion C | — | — | 24 | — | — |
| | Polyurethane Emulsion | 20 | — | — | — | — |
| Wetting agent | 3-methyl-1,3-butanediol | 15.3 | — | — | 18.92 | — |
| | Ttriethylene glycol | — | — | — | — | — |
| | 1,3-butanediol | — | 18.92 | 20 | — | 18.92 |
| | N-methyl-2-pyrrolidone | — | — | — | 1.31 | — |
| | Glycerine | 5.1 | 6.31 | 6.7 | 5 | 6.31 |
| Penetrating agent | Octanediol | 1 | 2 | 2 | — | 2 |
| | 1,2-hexanediol | 1 | — | — | 2 | — |
| Surfactant | POLYFOX PF-151N | — | — | — | 2 | — |
| | ZONYL FS-300 | 2 | — | 2.5 | — | 2.5 |
| | SOFTANOL EP-5035 | — | 1 | — | — | — |
| Fungicide | Proxel GXL | 0.05 | 0.05 | 0.05 | 0.05 | 0.05 |
| Deforming agent | Silicone deforming agent KM-72F | 0.1 | 0.1 | 0.1 | 0.1 | 0.1 |
| | Pure Water | Residual quantity | Residual quantity | Residual quantity | Residual quantity | Residual quantity |
| | Total (% by mass) | 100 | 100 | 100 | 100 | 100 |

TABLE 3

| | Ingredients (% by mass) | Comp. Ex. 1 | Comp. Ex. 2 | Comp. Ex. 3 | Comp. Ex. 4 | Comp. Ex. 5 |
|---|---|---|---|---|---|---|
| Dispersed Solution of Pigment | Dispersed Solution of Surface-Treated Black Pigment (Preparation Example 2) | 26.67 | — | — | — | — |
| | Dispersed Solution of Magenta Pigment-Containing Polymer Particulates (Preparation Example 3) | — | — | — | — | — |
| | Dispersed Solution of Yellow Pigment Surfactant (Preparation Example 4) | — | — | — | — | — |
| | Dispersed Solution of Magenta Pigment Surfactant (Preparation Example 5) | — | 21.43 | — | — | — |
| | Dispersed Solution A of Cyan Pigment Surfactant (Preparation Example 6) | — | — | — | 25.67 | — |
| | Dispersed Solution B of Cyan Pigment Surfactant (Preparation Example 7) | — | — | — | — | — |
| | Dispersed Solution C of Cyan Pigment Surfactant (Preparation Example 8) | — | — | 21.67 | — | 20 |
| Water-dispersible resin | Fluorine resin emulsion A | — | 6 | — | — | — |
| | Fluorine resin emulsion B | 4 | — | — | 7 | — |
| | Fluorine resin emulsion C | — | — | — | — | — |
| | Polyurethane Emulsion | — | — | 57.78 | — | — |
| Wetting agent | 3-methyl-1,3-butanediol | — | 10 | — | — | — |
| | Ttriethylene glycol | 20 | 15 | — | 22.5 | — |
| | 1,3-butanediol | — | — | 10 | — | 18.9 |
| | N-methyl-2-pyrrolidone | — | — | — | — | — |
| | Glycerine | 10 | 15 | 5 | 10 | 6.3 |
| Penetrating agent | Octanediol | — | 2 | 2 | — | — |
| | 1,2-hexanediol | 1 | — | — | — | 3 |
| Surfactant | POLYFOX PF-151N | — | 2 | 2 | — | 2 |
| | ZONYL FS-300 | — | — | — | — | — |
| | SOFTANOL EP-5035 | 2 | — | — | — | — |

TABLE 3-continued

|  | Ingredients (% by mass) | Comp. Ex. 1 | Comp. Ex. 2 | Comp. Ex. 3 | Comp. Ex. 4 | Comp. Ex. 5 |
|---|---|---|---|---|---|---|
| Fungicide | Proxel GXL | 0.05 | 0.05 | 0.05 | 0.05 | 0.05 |
| Deforming agent | Silicone deforming agent KM-72F | 0.1 | 0.1 | 0.1 | 0.1 | 0.1 |
|  | Pure Water | Residual quantity | Residual quantity | Residual quantity | Residual quantity | Residual quantity |
|  | Total (% by mass) | 100 | 100 | 100 | 100 | 100 |

TABLE 4

|  | Ingredients (% by mass) | Example 12 | Comp. Ex. 6 | Comp. Ex. 7 |
|---|---|---|---|---|
| Dispersed Solution of Pigment | Dispersed Solution of Surface-Treated Black Pigment (Preparation Example 2) | — | — | 27.33 |
|  | Dispersed Solution of Magenta Pigment-Containing Polymer Particulates (Preparation Example 3) | — | — | — |
|  | Dispersed Solution of Yellow Pigment Surfactant (Preparation Example 4) | — | — | — |
|  | Dispersed Solution of Magenta Pigment Surfactant (Preparation Example 5) | — | — | — |
|  | Dispersed Solution A of Cyan Pigment Surfactant (Preparation Example 6) | — | 11.00 | — |
|  | Dispersed Solution B of Cyan Pigment Surfactant (Preparation Example 7) | 15.33 | — | — |
|  | Dispersed Solution C of Cyan Pigment Surfactant (Preparation Example 8) | — | — | — |
| Water-dispersible resin | Fluorine resin emulsion A | — | 60 | 65.6 |
|  | Fluorine resin emulsion B | 40 | — | — |
|  | Fluorine resin emulsion C | — | — | — |
|  | Polyurethane Emulsion | — | — | — |
| Wetting agent | 3-methyl-1,3-butanediol | — | — | — |
|  | Ttriethylene glycol | — | — | — |
|  | 1,3-butanediol | — | 16.8 | — |
|  | N-methyl-2-pyrrolidone | — | — | — |
|  | Glycerine | 34.5 | 8.4 | 2 |
| Penetrating agent | Octanediol | 2 | 2 | — |
|  | 1,2-hexanediol | — | — | 2 |
| Surfactant | POLYFOX PF-151N | — | — | — |
|  | ZONYL FS-300 | — | 1.5 | 2.5 |
|  | KF-643 | 1 | — | — |
|  | SOFTANOL EP-5035 | — | — | — |
| Fungicide | Proxel GXL | 0.05 | 0.05 | 0.05 |
| Deforming agent | Silicone deforming agent KM-72F | 0.1 | 0.1 | 0.1 |
|  | Pure Water | Residual quantity | Residual quantity | Residual quantity |
|  | Total (% by mass) | 100 | 100 | 100 |

Omitted explanations will be provided for compounds found in Tables 1 to 4 as follows.

Fluorine resin emulsion A: LUMIFLON FE 4300 manufactured by ASAHI GLASS CO., LTD., which had a solid content of 50% by mass, an average particle diameter of 150 nm and a minimum film formation temperature (MFT) of 30° C. or lower Fluorine resin emulsion B: LUMIFLON FE 4500 manufactured by ASAHI GLASS CO., LTD., which had a solid content of 50% by mass, an average particle diameter of 160 nm and a minimum film formation temperature (MFT) of 28° C. or lower Fluorine resin emulsion C: LUMIFLON FE 4400 manufactured by ASAHI GLASS CO., LTD., which had a solid content of 50% by mass, an average particle diameter of 200 nm or smaller and a minimum film formation temperature (MFT) of 55° C.

Polyurethane emulsion: HYDRAN APX-101H manufactured by Dainippon Ink and Chemicals, Incorporated, which had a solid content of 45% by mass, an average particle diameter of 160 nm and a minimum film formation temperature (MFT) of 20° C. or lower POLYFOX PF-151N: a 50% solution of non-ionic fluorinated oligomer surfactants manufactured by OMNOVA Solutions Inc.

ZONYL FS-300: a 40% solution of polyoxyethylene perfluoro alkylether manufactured by DuPont Ltd.

KF-643: a 100% solution of polyether modified silicone surfactant manufactured by Shin-Etsu Chemical Co., Ltd.

SOFTANOL FP-5035: a 100% solution of polyoxyethylene polyoxypropylene branched alkylether manufactured by Nippon Shokubai Co. Ltd.

Proxel GXL: a 20% dipropylene glycol-containing solution of 1,2-benzisothiazolin-3-one and a fungicide manufactured by Avecia Ltd.

KM-72F: a 100% solution of self-emulsifying silicone deforming agent manufactured by Shin-Etsu Silicones The recording inks of Examples 1 to 12 and Comparative Examples 1 to 7 were evaluated as described below. The results are shown in Tables 5 and 6.

<The Ratio of Resin (A) to Pigment (B)>

The ratio of the solid content of the resin in the water-soluble resin (emulsion) to the solid content of the pigment, or the solid content (A) of the resin/the solid content (B) of the pigment, was measured for each of the recording inks.

<The Solid Content of Ink>

The total content of the pigment and resin, or emulsion and water-soluble resin, in each of the recording inks was measured.

<Measurement of Ink Viscosity>

The ink viscosities at 25° C. were measured with RL-500 (a viscometer manufactured by TOKI SANGYO CO., LTD.).

<Measurement of Ink Surface Tension>

The ink surface tensions at 25° C. were measured using CBVP-Z (a full automatic tensiometer manufactured by Kyowa Interface Science Co., Ltd.).

—Evaluation of Image Recording Quality—

IPSIOG707 (an inkjet printer manufactured by Ricoh Company, Ltd.) was used under 23° C. and 50% relative humidity to record an image on a recording medium. The driving voltage applied to the piezoelectric elements was adjusted so that the ejected ink drops forming image were in a uniform amount.

<Ejection Stability>

An A4 size chart-document having fill areas each occupying 5% of the total area per color, obtained using Microsoft Word 2000, was printed on 200 sheets of paper using Type 6200 (a printer manufactured by NBS Ricoh Co., Ltd.). After the completion of printing, nozzles for each color of the printer were investigated to evaluate the ejection stability. The printer was run using the driver software supplied with the printer. Before the printing, the printing mode was changed from "regular paper—normal/fast" to "no color correction" in the user configuration menu for regular paper.

<Evaluation Criteria>

A: No ejection disturbance was recognized.

B: Slight ejection disturbance was recognized.

C: Ejection disturbance or ejection blocking was recognized.

<Image Density>

A chart-document having 64 point block (■) portions, obtained using Microsoft Word 2000, was printed on a sheet of paper using Xerox 4024 (a printer manufactured by Fuji Xerox Co., Ltd.). After the completion of printing, the color of the printed block portions was investigated with X-Rite 938 to evaluate the image density using the following evaluation criteria. The printer was run using the driver software supplied with the printer. Before the printing, the printing mode was changed from "regular paper—normal/fast" to "no color correction" in the user configuration menu for regular paper.

<Evaluation Criteria>

A: Black: 1.3 or more—Yellow: 0.85 or more—Magenta: 0.95 or more—Cyan: 1.1 or more B: Black: 1.2 or more to less than 1.3—Yellow: 0.8 or more to less than 0.85—Magenta: 0.9 or more to less than 0.95—Cyan: 1.0 or more to less than 1.1

C: Black: 1.1 or more to less than 1.2—Yellow: 0.7 or more to less than 0.8—Magenta: 0.8 or more to less than 0.90—Cyan: 0.9 or more to less than 1.0

D: Black: less than 1.1—Yellow: less than 0.7—Magenta: less than 0.8—Cyan: less than 0.9

<Color Gamut>

The chart was recorded using Xerox 4024 (manufactured by Fuji Xerox Co., Ltd.) in the same manner as in evaluating the image density, and then printed block (■) portions were investigated with X-Rite 938 to evaluate the color gamut using the following evaluation criteria. The printer was run using the driver software supplied with the printer. Before the printing, the printing mode was changed from "regular paper—normal/fast" to "no color correction" in the user configuration menu for regular paper. The ratio of the measured saturation to the saturation (yellow: 91.34, magenta: 74.55 and cyan: 62.82) stated in the standard color (Japan Color Ver. 2) was obtained to evaluate the color gamut using the following evaluation criteria.

<Evaluation Criteria>

○A: 0.8 or more

B: less than 0.8

<Water Resistance>

The chart was recorded using Type 6200 (manufactured by NBS Ricoh Co., Ltd.) in the same manner as in evaluating the image density, and then printed block (■) portions were dried under 23° C. and 50% relative humidity for 24 hours. The areas were soaked into 30° C. water for 1 minute and carefully plucked from water, and then they were allowed to dry naturally. Then, their water resistance was evaluated using the following criteria.

<Evaluation Criteria>

○A: No ink exudation was recognized

B: Ink exudation was recognized

<Abrasion-Resistance>

A chart document having a monochrome fill area which was 3 cm in length and width, obtained using Microsoft Word 2000, was printed on Ricoh Matte Glossy Paper for Geljet Printer (manufactured by NBS Ricoh Co., Ltd.). The printed image was then dried under 23° C. and 50% relative humidity for 24 hours. The image portion was rubbed back and forth 5 times with cotton (conforming to JIS L0803 standard) attached to a CM-1 clock meter using a double-faced adhesive. Amount of transferred ink from the image portion to that cotton was measured using X-Rite 938. Based on the measured amount, the density of the transferred ink on cotton was obtained and evaluated using the following criteria. The effect of the original color of that cotton was eliminated for obtaining the density.

<Evaluation Criteria>

A: less than 0.12

B: 0.12 or more

<Light Resistance>

The chart was recorded using Type 6200 (manufactured by NBS Ricoh Co., Ltd.) in the same manner as in evaluating the image density, and then printed block (■) portions were dried under 23° C. and 50% relative humidity for 24 hours. The printed block portions were subjected to a xenon irradiation at 0.35 W/m$^2$ (340 nm) using Ci35AW (a Weather-O'meter manufactured by Atlas Electric Devices Co.), which is an approximated sunlight, for 24 hours under 70° C., 50% relative humidity and 89° C. black panel temperature. The color deterioration and change in color of the printed block portions before and after being exposed to the xenon irradiation were measured and evaluated using the following evaluation criteria.

<Evaluation Criteria>
A: Little deterioration and change were recognized
B: Deterioration and change were recognized while they were allowable
C: Deterioration and change were too large to be allowed
<Drying Characteristic>
The chart was recorded using Type 6200 (manufactured by NBS Ricoh Co., Ltd.) in the same manner as in evaluating the image density, and then filter paper was pressed against the printed block (■) portions immediately after they were printed. The drying characteristic was evaluated based on the degree of ink transferred to filter paper.
<Evaluation Criteria>
A: Transferred ink was not recognized on filter paper
☐B: A small amount of ink transferred on filter paper
C: A large amount of ink transferred on filter paper
<Ink Storage Stability>
In a glass sample bottle, 20 g of each ink prepared in Examples and Comparative Examples was hermetically-sealed. The lid of the glass sample bottle was further fastened and sealed with a vinyl tape, and then the glass sample bottle was kept in a constant-temperature bath at 50° C. for 1 month. Changes in the particle diameters was measured using NANOTRAC UPA-EX 150 (a particle size analyzer manufactured by NIKKISO Co., Ltd.). Percentage changes of the average particle diameter ($D_{50}$%) of the inks after they were stored against its initial particle diameter were obtained using the following Equation 2.

Percentage change=[(Average particle diameter after stored/average particle diameter before stored)−1]*100    <<Equation 2>>

<Evaluation Criteria>
A: The percentage change was within plus/minus 10% exclusively
B: The percentage change was plus/minus 10% or more and within plus/minus 20% exclusively.
: The percentage change was plus/minus 20% or more

TABLE 5

| | Property of Ink | | | | |
| --- | --- | --- | --- | --- | --- |
| | Ratio of Resin (A) to Pigment (B) - A/B | Solid Content of Ink (% by mass) | Amount of Wetting Agent (% by | Viscosity (mPa·s) | Surface Tension (mN/m) |
| Ex. 1 | 0.5 | 12.0 | 28.4 | 8.5 | 26.1 |
| Ex. 2 | 2.3 | 20.0 | 25.2 | 10.6 | 25.9 |
| Ex. 3 | 3.0 | 20.3 | 28.0 | 11.3 | 27.5 |
| Ex. 4 | 2.0 | 21.4 | 26.0 | 12.8 | 26.0 |
| Ex. 5 | 4.0 | 20.2 | 26.0 | 10.9 | 26.3 |
| Ex. 6 | 3.0 | 20.3 | 26.0 | 11.0 | 26.4 |
| Ex. 7 | 2.0 | 27.0 | 20.4 | 16.9 | 25.9 |
| Ex. 8 | 4.0 | 25.3 | 25.2 | 19.1 | 31.5 |
| Ex. 9 | 2.0 | 18.3 | 26.7 | 10.3 | 25.7 |
| Ex. 10 | 11.5 | 26.1 | 25.2 | 14.7 | 25.9 |
| Ex. 11 | 2.0 | 12.2 | 25.2 | 5.6 | 25.8 |
| Ex. 12 | 5.0 | 24.2 | 34.5 | 15.0 | 26.6 |
| Comp. Ex. 1 | 0.25 | 10.0 | 30.0 | 7.8 | 32.2 |
| Comp. Ex. 2 | 0.5 | 9.3 | 40.0 | 17.4 | 25.6 |
| Comp. Ex. 3 | 4.0 | 32.5 | 15.0 | 24.8 | 26.5 |
| Comp. Ex. 4 | 0.5 | 10.9 | 32.5 | 8.6 | 37.8 |
| Comp. Ex. 5 | — | 6.3 | 25.2 | 4.7 | 25.6 |
| Comp. Ex. 6 | 10.0 | 33.2 | 25.2 | 22.8 | 26.5 |
| Comp. Ex. 7 | 4.0 | 41.0 | 2.0 | 25.6 | 25.8 |

TABLE 6

| | Evaluation of Printer/Image | | | | | | | |
| --- | --- | --- | --- | --- | --- | --- | --- | --- |
| | Ejection Stability | Image Density | Color Gamut | Water Resistance | Abrasion Resistance | Light Resistance | Drying Characteristic | Ink Storage Stability |
| Ex. 1 | B | C | — | B | B | B | C | B |
| Ex. 2 | B | A | B | B | B | B | B | B |
| Ex. 3 | B | A | B | B | B | B | B | B |
| Ex. 4 | B | A | B | B | B | B | B | B |
| Ex. 5 | B | A | B | B | B | B | B | B |
| Ex. 6 | B | A | B | B | B | B | B | B |
| Ex. 7 | C | A | — | B | B | B | B | B |
| Ex. 8 | C | A | B | B | B | B | C | C |
| Ex. 9 | B | A | B | B | B | B | B | B |
| Ex. 10 | C | B | B | B | B | B | B | C |
| Ex. 11 | B | B | B | B | B | B | C | C |

TABLE 6-continued

<table>
<tr><th colspan="9">Evaluation of Printer/Image</th></tr>
<tr><th></th><th>Ejection Stability</th><th>Image Density</th><th>Color Gamut</th><th>Water Resistance</th><th>Abrasion Resistance</th><th>Light Resistance</th><th>Drying Characteristic</th><th>Ink Storage Stability</th></tr>
<tr><td>Ex. 12</td><td>B</td><td>A</td><td>B</td><td>B</td><td>B</td><td>B</td><td>B</td><td>B</td></tr>
<tr><td>Comp. Ex. 1</td><td>B</td><td>C</td><td>—</td><td>B</td><td>D</td><td>B</td><td>D</td><td>B</td></tr>
<tr><td>Comp. Ex. 2</td><td>B</td><td>B</td><td>D</td><td>B</td><td>B</td><td>B</td><td>D</td><td>B</td></tr>
<tr><td>Comp. Ex. 3</td><td>D</td><td>—</td><td>—</td><td>—</td><td>—</td><td>—</td><td>—</td><td>—</td></tr>
<tr><td>Comp. Ex. 4</td><td>B</td><td>B</td><td>D</td><td>B</td><td>B</td><td>B</td><td>D</td><td>B</td></tr>
<tr><td>Comp. Ex. 5</td><td>B</td><td>C</td><td>D</td><td>B</td><td>D</td><td>C</td><td>C</td><td>D</td></tr>
<tr><td>Comp. Ex. 6</td><td>D</td><td>—</td><td>—</td><td>—</td><td>—</td><td>—</td><td>—</td><td>—</td></tr>
<tr><td>Comp. Ex. 7</td><td>D</td><td>—</td><td>—</td><td>—</td><td>—</td><td>—</td><td>—</td><td>—</td></tr>
</table>

Images recorded using the inks of Comparative Examples 3, 6 and 7 were not as good as images recorded using other inks. Thus, they were not evaluated.

Using the below mentioned recording papers (1) to (4) and the recording inks of Examples 3 to 5, image quality evaluation tests were performed as described below.

—Recording Paper (1)—
Trade name: AURORACOATE (commercially available paper having a basis weight of 104.7 g/m$^2$, manufactured by Nippon Paper Group, Inc.)

—Recording Paper (2)—
POD Gloss Coat 100 g/m$^2$, manufactured by Oji paper Co., Ltd.

—Recording Paper (3)—
Trade name: Super Fine Paper (commercially available matte-coated paper for inkjet printing, manufactured by Seiko Epson Corporation)

—Recording Paper (4)—
Trade name: Lumirror U10 (transparent polyester film having a thickness of 100 μm, manufactured by TORAY Industries Inc.)

The transfer amount of purified water to each of the recording papers (1) to (4) was measured as follows. The results are shown in Table 7.

<Measurement of the Transfer Amount of Purified Water Using Dynamic Scanning Absorptometer>

Absorption curves of purified water to the recording papers (1) to (4) were obtained using a dynamic scanning absorptometer (model: KS350D, manufactured by Kyowa Seiko Co., Ltd.). The absorption curve was obtained by plotting a sloped-straight line from the transfer amount (mL/m$^2$) and the square root of the contacting time. The transfer amount after a certain period of time was determined by interpolation.

TABLE 7

<table>
<tr><th></th><th colspan="2">The transfer amount of purified water (mL/m$^2$)</th></tr>
<tr><th></th><th>Contacting time 100 ms</th><th>Contacting time 400 ms</th></tr>
<tr><td>Recroding Paper (1)</td><td>2.8</td><td>3.4</td></tr>
<tr><td>Recroding Paper (2)</td><td>3.1</td><td>3.5</td></tr>
<tr><td>Recroding Paper (3)</td><td>41.0</td><td>44.8</td></tr>
<tr><td>Recroding Paper (4)</td><td>0.1</td><td>0.1</td></tr>
</table>

<Evaluation of Image Quality>

Using the recording papers (1) to (4) and the recording inks of Examples 3 to 5 in IPSIO G7570 (an inkjet recording apparatus manufactured by Ricoh Company, Ltd.), image quality evaluation tests were performed as described below. The results are shown in Table 8.

(1) Beading (Nonuniformity in Image Density)

The degrees of the nonuniformity in the image density of resulted green fill areas were visually evaluated. For evaluation criteria, stepped samples (grading from poor/1.0 to good/5.0) were used.

(2) Spur Marks

The frequency of the occurrences of offset-spur marks from resulted red fill areas to background portions was visually evaluated. The evaluation criteria and ranks are as follows.

Rank 1: Clearly recognized
Rank 2: Faintly recognized
Rank 3: Unrecognized (3) Gloss Degree Using a glossmeter (manufactured by BYK Gardner, 4501), the gloss degree of resulted cyan fill areas at 60° was measured.

TABLE 8

<table>
<tr><th></th><th>Beading</th><th>Spur Marks</th><th>Gloss Degree</th></tr>
<tr><td>Recording Paper (1)</td><td>4.5</td><td>2.0</td><td>33.0</td></tr>
<tr><td>Recording Paper (2)</td><td>3.5</td><td>2.0</td><td>25.0</td></tr>
<tr><td>Recording Paper (3)</td><td>5.0</td><td>3.0</td><td>2.0</td></tr>
<tr><td>Recording Paper (4)</td><td>1.0</td><td>1.0</td><td>Could not be measured</td></tr>
</table>

*The ink did not dry, thus the gloss degree could not be measured.

INDUSTRIAL APPLICABILITY

The recording ink of the present invention can record high quality images on regular paper, and particularly, can record images having an excellent image density, saturation and image durability characteristics which include water resistance and light resistance, has a fast drying speed, and can be used in fast recording processes and stably injected from nozzles. Thus, it can be suitably used in, for example, ink cartridges, ink recorded matters, inkjet recording apparatuses and inkjet recording methods.

The ink can further record fast-drying images, prevent the ink from causing beading and form images as good quality as offset printed products even on regular printing paper which is a recording medium having a poor ink absorbency, wherein the recording medium has a base and a coating which is provided on at least one side of the base, the transfer amount of pure water to the recording medium is in the range of from 2 ml/m² to 35 ml/m² when measured at a contacting time of 100 ms and with a dynamic scanning absorptometer, and the transfer amount of pure water to the recording medium is in the range of from 3 ml/m² to 40 ml/m² when measured at a contacting time of 400 ms.

The inkjet recording apparatus and the inkjet recording method of the present invention can be applied to various recordings with the inkjet recording system, and, can be suitably applied to, for example, printers for inkjet recording, facsimile apparatuses, copying apparatuses and printer/facsimile/copia composite machines.

The invention claimed is:
1. A recording ink, comprising:
a water-dispersible colorant,
a water-dispersible resin,
wetting agents, which are glycerin and any one of 1,3-butanediol, and 3-methyl-1,3-butanediol,
a surfactant, and
water,
wherein the content of the wetting agent in the recording ink is in the range of from 20% by mass to 35% by mass,
the total solid content of the water-dispersible colorant and the water-dispersible resin in the recording ink is in the range of from 20% by mass to 27% by mass,
the water-dispersible resin contains fluorine resin particulates, and
the ratio A:B, where A is the solid content of the water-dispersible resin in the recording ink and B is the solid content of a pigment contained in the water-dispersible colorant in the recording ink, is in the range of 0.5 to 8.
2. The recording ink according to claim 1, wherein the water-dispersible colorant contains at least a hydrophilic group at its surface and is a pigment that is water-dispersible under the absence of a dispersant.
3. The recording ink according to claim 1, wherein the water-dispersible colorant is a polymer emulsion that is composed of polymer particulates containing a water-insoluble and/or hardly-soluble coloring material.
4. The recording ink according to claim 1, wherein
the water-dispersible colorant is a dispersed pigment containing a pigment, a pigment dispersant and a polymer dispersion stabilizer, and
the polymer dispersion stabilizer is any one of alpha-olefin/maleic anhydride copolymer represented by the following structural formula (1), styrene-(meth)acryl copolymers, water-soluble polyurethane resins and water-soluble polyester resins

Structural formula (1)

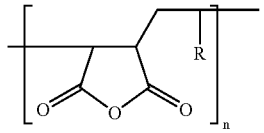

Where R represents an alkyl group, and n represents an integer of 30 to 100.
5. The recording ink according to claim 4, wherein
the polymer dispersion stabilizer has a weight average molecular weight of 20,000 or lower and an acid value of 40 mgKOH/g to 400 mgKOH/g, and is dissolved in any one of an alkali solution and alkali water-solution having an alkalinity value equivalent to or higher than the acid value to be used.
6. The recording ink according to claim 4, wherein the pigment dispersant is an anion surfactant or a nonionic surfactant having an HLB value of 10 to 20.
7. The recording ink according to claim 6, wherein the nonionic surfactant is any one of polyoxyethylene-3-naphthylether, polyoxyethylene laurylether and polyoxyethylene styrene phenylether.
8. The recording ink according to claim 1, wherein the fluorine resin particulates contain a fluoroolefin unit and have a minimum film forming temperature of 30 EC or lower.
9. The recording ink according to claim 1, wherein the surfactant comprises at least one selected from silicone surfactants and fluorine surfactants.
10. The recording ink according to claim 1, wherein the viscosity thereof at 25 EC is in the range of from 5 mPaXs to 20 mPaXs, and the surface tension thereof is 35 mN/m or lower.
11. An ink/media set, comprising:
a recording ink, and a recording medium,
wherein the recording medium comprises a base and a coating layer which is provided on at least one surface of the base, and
the transfer amount of pure water to the recording medium, measured with a dynamic scanning absorptometer, is in the range of from 2 ml/m² to 35 ml/m² at a contacting time of 100 ms and in the range of from 3 ml/m² to 40 ml/m² when measured at a contacting time of 400 ms, and wherein the recording ink comprises a water-dispersible colorant, a water-dispersible resin, wetting agents, a surfactant, and water,
wherein the wetting agents are glycerin and any one of 1,3-butanediol, and 3-methyl-1,3-butanediol,
wherein the content of the wetting agent in the recording ink is in the range of from 20% by mass to 35% by mass,
the total solid content of the water-dispersible colorant and the water-dispersible resin in the recording ink is in the range of from 12% by mass to 40% by mass,
the water-dispersible resin contains fluorine resin particulates, and
the ratio A:B, where A is the solid content of the water-dispersible resin in the recording ink and B is the solid content of a pigment contained in the water-dispersible colorant in the recording ink, is in the range of 0.5 to 8.
12. An ink cartridge, comprising a container that comprises a recording ink, wherein the recording ink comprises a water-dispersible colorant, a water-dispersible resin, wetting agents, a surfactant, and water,
wherein the wetting agents are glycerin and any one of 1,3-butanediol, and 3-methyl-1,3-butanediol,
wherein the content of the wetting agent in the recording ink is in the range of from 20% by mass to 35% by mass,
the total solid content of the water-dispersible colorant and the water-dispersible resin in the recording ink is in the range of from 20% by mass to 27% by mass,
the water-dispersible resin contains fluorine resin particulates, and
the ratio A:B, where A is the solid content of the water-dispersible resin in the recording ink and B is the solid content of a pigment contained in the water-dispersible colorant in the recording ink, is in the range of 0.5 to 8.
13. An inkjet recording method, comprising ejecting drops of a recording ink by applying an impulse thereto to record an image, wherein the recording ink comprises a water-dispersible colorant, a water-dispersible resin, wetting agents, a surfactant, and water, wherein the wetting agents are glycerin and any one of 1,3-butanediol, and 3-methyl-1,3-butanediol, wherein the content of the wetting agent in the recording ink is in the range of from 20% by mass to 35% by mass, the total solid content of the water-dispersible colorant and the water-dispersible resin in the recording ink is in the range of from 20% by mass to 27% by mass, the water-dispersible resin contains fluorine resin particulates, and the ratio A:B, where A is the solid content of the water-dispersible resin in the recording ink and B is the solid content of a pigment contained in the water-dispersible colorant in the recording ink, is in the range of 0.5 to 8.

14. The inkjet recording method according to claim 13, wherein the impulse is at least any one selected from heat, pressure, vibration and light.

15. An inkjet recording apparatus, comprising an ink jet unit comprising a recording ink, the ink jet unit configured to eject drops of the recording ink by applying an impulse thereto to record an image, wherein the recording ink comprises a water-dispersible colorant, a water-dispersible resin, wetting agents, a surfactant, and water, wherein the wetting agents are glycerin and any one of 1,3-butanediol, and 3-methyl-1,3-butanediol, wherein the content of the wetting agent in the recording ink is in the range of from 20% by mass to 35% by mass, the total solid content of the water-dispersible colorant and the water-dispersible resin in the recording ink is in the range of from 20% by mass to 27% by mass, the water-dispersible resin contains fluorine resin particulates, and the ratio A:B, where A is the solid content of the water-dispersible resin in the recording ink and B is the solid content of a pigment contained in the water-dispersible colorant in the recording ink, is in the range of 0.5 to 8.

16. The inkjet recording apparatus according to claim 15, wherein the impulse is at least any one selected from heat, pressure, vibration and light.

17. An ink recorded matter, comprising:

a recording medium and an image formed on the recording medium, wherein the image is formed using a recording ink which comprises a water-dispersible colorant, a water-dispersible resin, wetting agents, a surfactant, and water, wherein the wetting agents are glycerin and any one of 1,3-butanediol, and 3-methyl-1,3-butanediol, wherein the content of the wetting agent in the recording ink is in the range of from 20% by mass to 35% by mass, the total solid content of the water-dispersible colorant and the water-dispersible resin in the recording ink is in the range of from 20% by mass to 27% by mass, the water-dispersible resin contains fluorine resin particulates, and the ratio A:B, where A is the solid content of the water-dispersible resin in the recording ink and B is the solid content of a pigment contained in the water-dispersible colorant in the recording ink, is in the range of 0.5 to 8.

18. The recording ink according to claim 1, wherein the total solid content of the water-dispersible colorant and the water-dispersible resin in the recording ink is in the range of from 20.2% by mass to 27% by mass.

19. The ink/media set according to claim 11, wherein the total solid content of the water-dispersible colorant and the water-dispersible resin in the recording ink is in the range of from 20.2% by mass to 27% by mass.

20. The ink cartridge according to claim 12, wherein the total solid content of the water-dispersible colorant and the water-dispersible resin in the recording ink is in the range of from 20.2% by mass to 27% by mass.

21. The inkjet recording method according to claim 13, wherein the total solid content of the water-dispersible colorant and the water-dispersible resin in the recording ink is in the range of from 20.2% by mass to 27% by mass.

22. The inkjet recording apparatus according to claim 15, wherein the total solid content of the water-dispersible colorant and the water-dispersible resin in the recording ink is in the range of from 20.2% by mass to 27% by mass.

* * * * *